United States Patent
Deng et al.

(10) Patent No.: US 10,809,875 B2
(45) Date of Patent: Oct. 20, 2020

(54) DISPLAY CONTROL METHOD AND DEVICE, AND ELECTRONIC APPARATUS

(71) Applicant: Lenovo (Beijing) Co., Ltd., Haidian District, Beijing (CN)

(72) Inventors: Rui Deng, Beijing (CN); Yang Yang, Beijing (CN); Fei Gao, Beijing (CN); Li Ding, Beijing (CN); Xiaohai Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 260 days.

(21) Appl. No.: 14/974,696

(22) Filed: Dec. 18, 2015

(65) Prior Publication Data

US 2017/0038946 A1    Feb. 9, 2017

(30) Foreign Application Priority Data

Aug. 3, 2015  (CN) .......................... 2015 1 0479018
Aug. 3, 2015  (CN) .......................... 2015 1 0481729
Sep. 22, 2015  (CN) .......................... 2015 1 0607867

(51) Int. Cl.
*G06F 3/0482*     (2013.01)
*G06F 3/0481*     (2013.01)
(Continued)

(52) U.S. Cl.
CPC ........ *G06F 3/04817* (2013.01); *G06F 3/0482* (2013.01); *G06F 3/0488* (2013.01); *G06F 9/451* (2018.02)

(58) Field of Classification Search
CPC .... G06F 9/4443; G06F 3/0488; G06F 3/0483; G06F 3/04883; G06F 3/0482;
(Continued)

(56) References Cited

U.S. PATENT DOCUMENTS 5,377,317 A * 12/1994 Bates .................... G06F 3/0481
                                                                 714/E11.188
5,678,014 A * 10/1997 Malamud ............ G06F 3/04817
                                                                 715/835
(Continued)

FOREIGN PATENT DOCUMENTS

CN         101017498        8/2007
CN         102184072        9/2011
(Continued)

OTHER PUBLICATIONS

First Office Action (10 pages including English Translation) dated Oct. 9, 2017 from Chinese priority Application No. 201510479018.9.

(Continued)

*Primary Examiner* — Shen Shiau
(74) *Attorney, Agent, or Firm* — Brinks Gilson & Lione; John C. Freeman

(57) ABSTRACT

A display control method, a device thereof, and an electronic apparatus are disclosed. The display control method includes obtaining an input operation for a first folder icon in an interactive interface currently displayed on a display screen of an electronic apparatus; generating a call instruction in response to the input operation, the call instruction being used for starting a folder manager; starting the folder manager in response to the call instruction; obtaining all folders on the electronic apparatus under the folder manager; putting all the folders in an unfolded state; and displaying the folders in the unfolded state by the display screen in a queue manner.

11 Claims, 25 Drawing Sheets

(51) Int. Cl.
*G06F 3/0488* (2013.01)
*G06F 9/451* (2018.01)

(58) Field of Classification Search
CPC ............ G06F 3/04817; G06F 17/3007; G06F 17/30115; G06F 17/30994; G06F 17/30235; G06F 17/30126; G06F 9/451
See application file for complete search history.

(56) References Cited

U.S. PATENT DOCUMENTS

| | | | | |
|---|---|---|---|---|
| 5,694,561 | A * | 12/1997 | Malamud | G06F 3/0481 715/805 |
| 6,072,488 | A * | 6/2000 | McFarland | G06F 3/0481 715/799 |
| 6,915,489 | B2 | 7/2005 | Gargi | |
| 6,983,424 | B1 * | 1/2006 | Dutta | G06F 3/04817 715/790 |
| 8,185,839 | B2 * | 5/2012 | Jalon | G06F 16/168 715/769 |
| 8,464,176 | B2 | 6/2013 | Van Dok | |
| 8,539,373 | B1 * | 9/2013 | Jitkoff | G06F 3/0485 715/790 |
| 9,448,694 | B2 * | 9/2016 | Sharma | G06F 3/0486 |
| 2003/0154190 | A1 * | 8/2003 | Misawa | G06F 16/58 |
| 2004/0186857 | A1 * | 9/2004 | Serlet | G06F 16/173 |
| 2005/0055306 | A1 * | 3/2005 | Miller | G06Q 10/10 705/37 |
| 2005/0060665 | A1 * | 3/2005 | Rekimoto | G06F 9/451 715/810 |
| 2005/0177796 | A1 | 8/2005 | Takahashi | |
| 2007/0198561 | A1 | 8/2007 | Lee | |
| 2008/0155475 | A1 * | 6/2008 | Duhig | H04N 21/440263 715/830 |
| 2009/0217198 | A1 * | 8/2009 | Jung | G06F 3/0481 715/802 |
| 2010/0211872 | A1 * | 8/2010 | Rolston | G06F 9/451 715/702 |
| 2010/0251168 | A1 * | 9/2010 | Fujita | G06F 3/0483 715/790 |
| 2010/0251170 | A1 * | 9/2010 | Louch | G06F 16/95 715/810 |
| 2011/0138295 | A1 * | 6/2011 | Momchilov | G06F 3/0484 715/740 |
| 2011/0202877 | A1 * | 8/2011 | Lassonde | G06F 3/0482 715/817 |
| 2011/0296351 | A1 * | 12/2011 | Ewing, Jr. | G06F 3/0346 715/841 |
| 2012/0052918 | A1 * | 3/2012 | Yang | G06F 3/04817 455/566 |
| 2012/0084717 | A1 * | 4/2012 | Yao | G06F 3/0481 715/792 |
| 2012/0131495 | A1 * | 5/2012 | Goossens | G06F 3/04815 715/782 |
| 2012/0131496 | A1 * | 5/2012 | Goossens | G06F 9/451 715/784 |
| 2012/0206484 | A1 * | 8/2012 | Hauschild | B60R 16/0236 345/629 |
| 2012/0324368 | A1 * | 12/2012 | Putz | G06F 3/04883 715/748 |
| 2013/0021431 | A1 * | 1/2013 | Lemmey | H04N 21/485 348/14.08 |
| 2013/0139102 | A1 | 5/2013 | Miura et al. | |
| 2013/0174179 | A1 * | 7/2013 | Park | G06F 3/0483 718/107 |
| 2013/0275891 | A1 * | 10/2013 | Holiday | G06F 3/048 715/762 |
| 2014/0009402 | A1 * | 1/2014 | Ma | G06F 3/04842 345/173 |
| 2014/0137020 | A1 * | 5/2014 | Sharma | G06F 3/0482 715/769 |
| 2014/0208250 | A1 * | 7/2014 | Ording | G06F 3/04817 715/769 |
| 2014/0258849 | A1 * | 9/2014 | Chung | G06F 40/106 715/243 |
| 2014/0344765 | A1 * | 11/2014 | Hicks | G06F 3/04883 715/863 |
| 2015/0186397 | A1 * | 7/2015 | Cueto | G06F 16/168 715/854 |
| 2015/0200979 | A1 * | 7/2015 | Huang | G06F 3/0482 715/753 |
| 2015/0331573 | A1 * | 11/2015 | Zhu | G06F 3/04842 715/800 |
| 2016/0004388 | A1 * | 1/2016 | Lee | G06F 3/0482 715/768 |
| 2016/0034116 | A1 * | 2/2016 | Wang | G06F 16/172 715/838 |
| 2016/0034597 | A1 * | 2/2016 | Graf | G06F 9/451 715/761 |
| 2016/0085438 | A1 * | 3/2016 | Doan | G06F 3/04842 715/863 |
| 2017/0031563 | A1 | 2/2017 | Zhang | |
| 2017/0083180 | A1 * | 3/2017 | Nelson | G06F 3/0482 |

FOREIGN PATENT DOCUMENTS

| | | |
|---|---|---|
| CN | 102819584 | 12/2012 |
| CN | 102929706 | 2/2013 |
| CN | 103116456 | 5/2013 |
| CN | 103902609 | 7/2014 |
| CN | 104461237 | 3/2015 |
| CN | 104536684 A | 4/2015 |
| CN | 105094557 | 11/2015 |

OTHER PUBLICATIONS

First Office Action (13 pages including English translation) dated Oct. 11, 2017 from Chinese priority Application No. 201510481729.X.

First Office Action dated Dec. 4, 2017 (26 pages including English translation) from Chinese priority Application No. 201510607867.8.

Tips: creating nested folders in application folders of iOS8, iTumbledSea, [online] Retrieved from the Internet <URL: https://sspai.com/post/25858>, Sep. 26, 2014, 3 pages (1/7, 2/7 and 3/7).

How to create nested folders on the desktop of iOS7.1? On the desktop of iOS7.1 [online] Retrieved from the Internet <URL: http://www.pc841.com/shouji/iPhone/26098.html> Mar. 24, 2014 (four pages).

Creating nested folders in the folders of iOS8, [online] Retrieved from the Internet <URL: http://www.bkjia.com/iphonejc/892693.html> Oct. 13, 2014 (four pages).

Third Office Action dated Nov. 13, 2018 (14 pages including English translation) from Chinese priority Application No. 201510481729.X.

Office Action dated Apr. 16, 2018 (13 pages including English translation) from Chinese Application No. 201510481729.X.

Second Office Action dated Jul. 23, 2018 (21 pages including English translation) from Chinese Application No. 201510607867.8.

* cited by examiner

Display region
occupied by the tool folder

Switch operation does not
meet the predetermined condition

Switch operation
meets the predetermined condition

DISPLAY CONTROL METHOD AND DEVICE, AND ELECTRONIC APPARATUS

This application claims priority to Chinese patent application No. 201510481729.X filed on Aug. 3, 2015; Chinese patent application No. 201510479018.9 filed on Aug. 3, 2015; and Chinese patent application No. 201510607867.8 filed on Sep. 22, 2015, the entire contents of which are incorporated herein by reference.

The present disclosure relates to a display technology, and more particularly, to a display control method and a device thereof, and an electronic apparatus.

BACKGROUND

In an electronic apparatus, such as a mobile phone, a tablet personal computer (PAD), and a laptop, in order to facilitate management of applications, usually icon identifiers corresponding to a plurality of applications are gathered in a same folder. Currently, when there are a large number of folders, such a display interface appears to be relatively messy, which cannot bring a good visual experience to a user. At the same time, when there are a large number of folders, use efficiency of the electronic apparatus is reduced, for example, the user needs to enter to click on a folder icon, and then unfold the folder so as to view an application icon in the folder. However, once a desired application icon cannot be found in the folder, then it is necessary to exit the mode of unfolding the folder, and further click another folder icon to unfold the folder, so as to find the application icon within the unfolded folder again, and in a similar way, folders are clicked over and over again to unfold them, so as to find the application icon from the folders, which is cumbersome and complicated.

SUMMARY

In order to solve the above-described technical problem, embodiments of the present disclosure provide a display control method and a device thereof, and an electronic apparatus.

The display control method provided by an embodiment of the present disclosure comprises: obtaining an input operation for a first folder icon in an interactive interface currently displayed on a display screen of an electronic apparatus; generating a call instruction in response to the input operation, the call instruction being used for starting a folder manager; starting the folder manager in response to the call instruction; obtaining all folders on the electronic apparatus under the folder manager; putting all the folders in an unfolded state; and displaying the folders in the unfolded state by the display screen in a queue manner.

The display control device provided by an embodiment of the present disclosure comprises: a first obtaining unit, for obtaining an input operation for a first folder icon in an interactive interface currently displayed on a display screen of an electronic apparatus; a first responding unit, for generating a call instruction in response to the input operation, the call instruction being used for starting a folder manager; a second responding unit, for starting the folder manager in response to the call instruction; a second obtaining unit, for obtaining all folders on the electronic apparatus under the folder manager; a processing unit, for putting all the folders in an unfolded state; and a display unit, for displaying the folders in the unfolded state by the display screen in a queue manner.

The electronic apparatus provided by an embodiment of the present disclosure comprises: a display screen; a processor, for obtaining an input operation for a first folder icon in an interactive interface currently displayed on the display screen; generating a call instruction in response to the input operation, the call instruction being used for starting a folder manager; starting the folder manager in response to the call instruction; obtaining all folders on the electronic apparatus under the folder manager; putting all the folders in an unfolded state; and displaying the folders in the unfolded state by the display screen in a queue manner.

In the technical solutions of the embodiments of the present disclosure, after all the folders on the display interface are unfolded, they are displayed by the display screen in the queue manner. When there are a large number of folders, the folders displayed in the queue manner are in a relatively good order, a user can conveniently select a desired application from the unfolded folders in the queue, and the user operates conveniently, which brings a good experience to the user.

BRIEF DESCRIPTION OF THE DRAWINGS

FIG. 2-1 is a schematic implementation flowchart of a display control method according to Embodiment Two of the present disclosure;

FIG. 2-2 is a schematic diagram I of a queue manner of displaying according to the embodiment of the present disclosure.

FIG. 2-3 is a schematic diagram II of the queue manner of displaying according to the embodiment of the present disclosure.

FIG. 2-4 is a schematic diagram III of the queue manner of displaying according to the embodiment of the present disclosure.

FIG. 3 is a schematic implementation flowchart of a display control method according to Embodiment Three of the present disclosure;

FIG. 4 is a schematic implementation flowchart of a display control method according to Embodiment Four of the present disclosure;

FIG. 11($b$) schematically illustrates a folder presentation example under a second presentation manner;

DETAILED DESCRIPTION

In order to understand characteristics and technical contents of the embodiments of the present disclosure in more detail, hereinafter, implementation of the embodiments of the present disclosure will be illustrated in detail in conjunction with the accompanying drawings, and the attached accompanying drawings only serve as reference for description, but are not intended to limit the embodiments of the present disclosure.

Embodiment One

The embodiment of the present disclosure provides a display control method, which is applied to an electronic apparatus. A function realized by the display control method can be implemented by a processor in the electronic apparatus which calls program codes. Of course, the program codes can be stored in a computer storage medium. It can be seen that the electronic apparatus at least comprises a processor and a storage medium.

Figure 1:
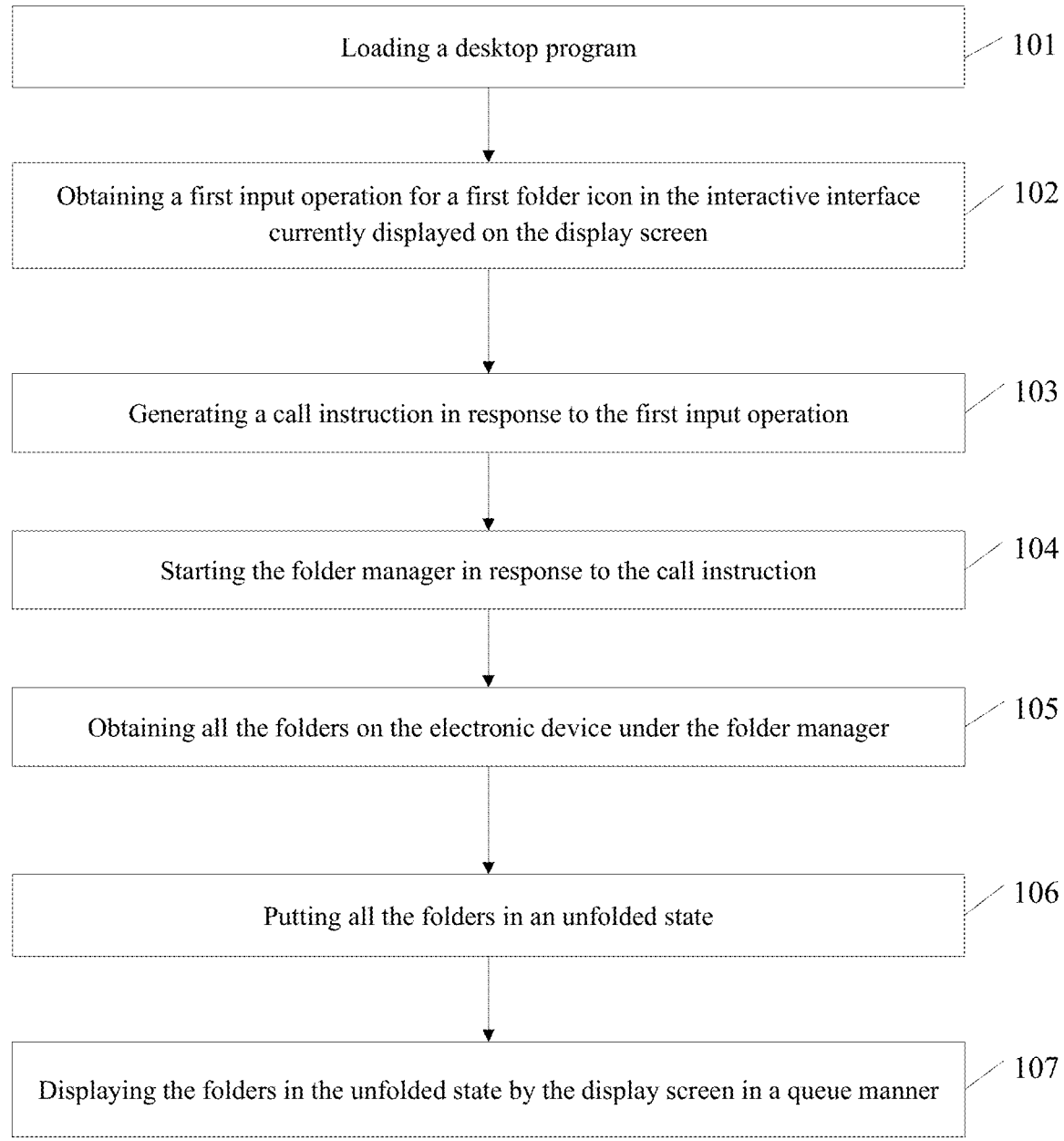
FIG. 1 is a schematic implementation flowchart of a display control method according to Embodiment One of the present disclosure.

FIG. 1 is a schematic implementation flowchart of a display control method according to Embodiment One of the present disclosure. As shown in FIG. 1, the display control method comprises steps 101 to 107.

Step 101: loading a desktop program. Here, the desktop program includes an interactive interface, the interactive interface includes a plurality of folders, and the interactive interface is displayed by a display screen of the electronic apparatus. Here, the electronic apparatus may be such a type of fixed electronic apparatus as a Personal Computer (PC), or may be such a type of portable electronic apparatus as a personal digital assistant (PDA), a tablet personal computer and a handheld computer, and of course, may also be such a type of smart mobile terminal as a smart phone.

Step 102: obtaining a first input operation for a first folder icon in the interactive interface currently displayed on the display screen.

Here, the first folder icon refers to an icon identifier of the first folder. The first folder may be any folder in the folders included in the desktop program.

Here, the first input operation varies according to a type of the electronic apparatus. For example, when the electronic apparatus is an ordinary personal computer, and an input apparatus is a mouse, the first input operation may be a click operation on the display screen by a user through the mouse. When a display apparatus of the electronic apparatus is a touch display screen (for example, a smart phone, a tablet personal computer or a desktop computer uses the touch display screen), the first input operation may be a touch operation of an operating body, wherein the operating body includes a finger, a stylus and so on. It should be noted that, those skilled in the art may define a specific operation manner of the first input operation by themselves. For example, the first input operation may include an operation of clicking the first folder icon by the user through the mouse; for another example, the first input operation may be: an operation of touching the first folder icon by the user through a finger. In the specific implementation process, it may not be limited to the manners provided by the embodiment of the present disclosure, and those skilled in the art may implement the above-described first input operation by a variety of prior arts, which will not be described. As can be seen from the above description, in addition to the display screen, the electronic apparatus further has an input apparatus. When the electronic apparatus uses the touch display screen (touch screen), the input apparatus and the display screen of the electronic apparatus are combined into one.

Step 103: generating a call instruction in response to the first input operation. Here, the call instruction is used for starting a folder manager.

Step 104: starting the folder manager in response to the call instruction. Here, the folder manager is used for managing all folders on the electronic apparatus, and the content managed includes a state of a folder, and determining the number of icons which can be presented in the folder, a size of an icon, and so on. The state of a folder includes a foreground state and a background state. When the folder is in the foreground state, the folder is activated, and all the icon identifiers within the folder can be viewed by the user. When the folder is in the background state, the folder is inactivated. In other words, the folder is in a closed state. In the closed state, the user is unable to view the icon identifier under the folder.

Step 105: obtaining all the folders on the electronic apparatus under the folder manager. Here, when the electronic apparatus has a desktop program APP installed thereon, the desktop program will classify the icon identifiers (icons) of all to-be-managed objects on the electronic apparatus in a form of folder. The icons of the to-be-managed objects on the electronic apparatus include icons of APP, folders, and files, etc. It should be noted that, when the desktop program is applied to the mobile phone and the tablet personal computer, the object to be managed by the desktop program is mainly the icon of the APP.

Step 106: putting all the folders in an unfolded state.

Step 107: displaying the folders in the unfolded state by the display screen in a queue manner.

Embodiment Two

Based on the aforesaid Embodiment One, the embodiment of the present disclosure provides a display control method, which is applied to an electronic apparatus. A function realized by the display control method can be implemented by a processor in the electronic apparatus which calls program codes. Of course, the program codes can be stored in a computer storage medium. It can be seen that the electronic apparatus at least comprises a processor and a storage medium.

In the embodiment of the present disclosure, each folder within the interactive interface has a corresponding folder icon on the interactive interface. The call instruction is generated for the input operation for each of the folder icons.

Figures 1, 2:
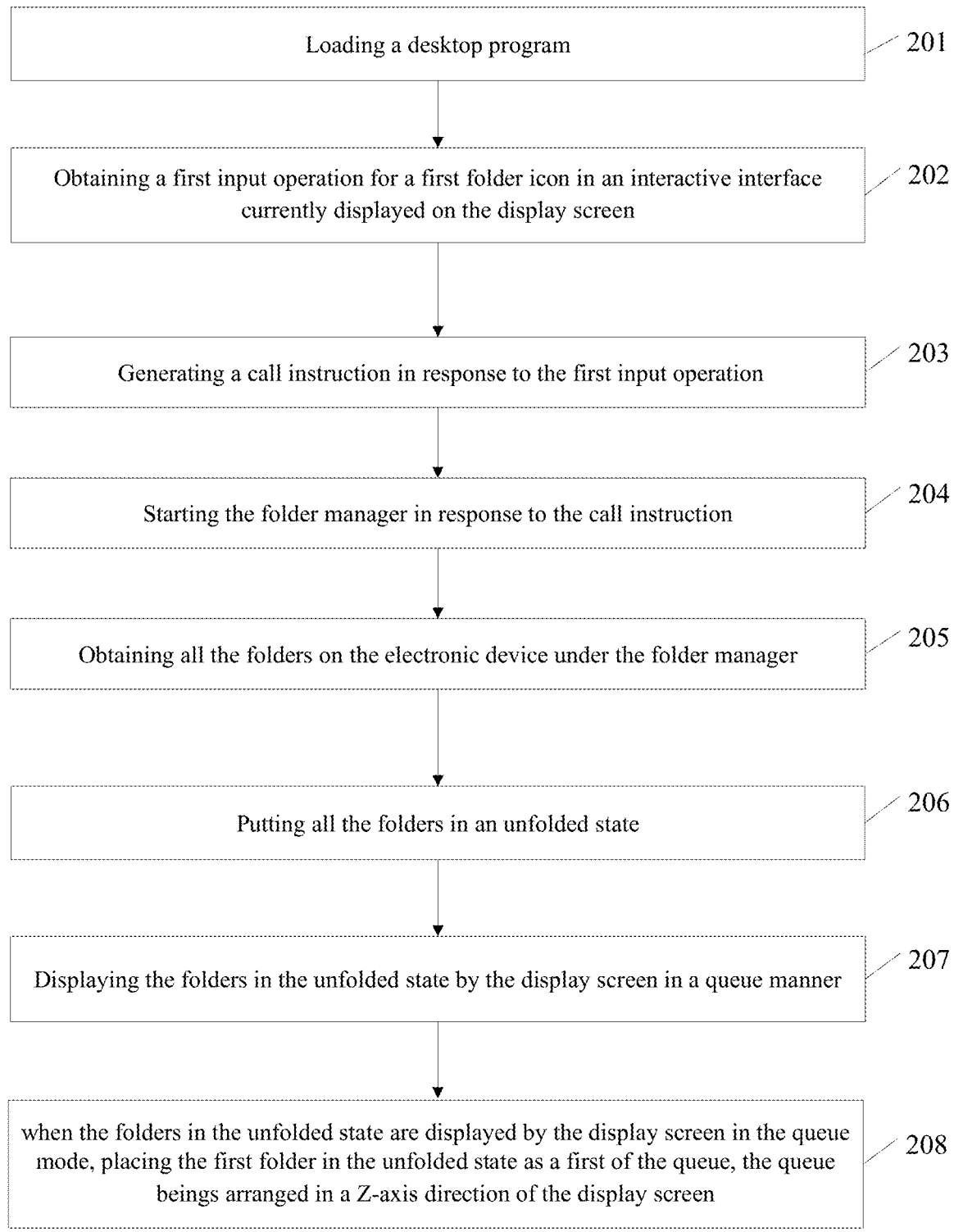
Figure 2:
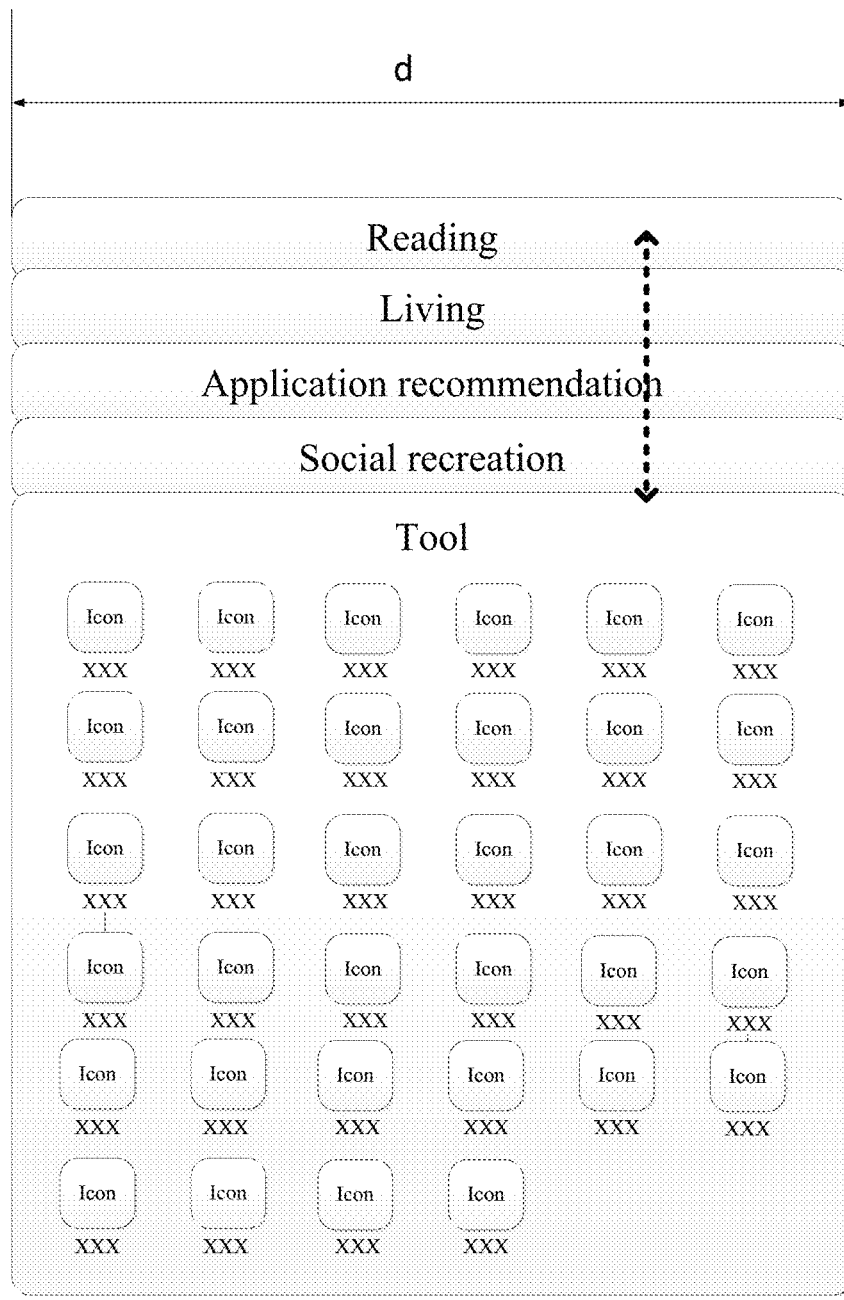

FIG. 2-1 is a schematic implementation flowchart of a display control method according to Embodiment Two of the present disclosure. As shown in FIG. 2-1, the display control method comprises steps 201 to 208.

Step 201: loading a desktop program. Here, the desktop program includes an interactive interface, the interactive interface includes a plurality of folders, and the interactive interface is displayed by a display screen of the electronic apparatus.

Step 202: obtaining a first input operation for a first folder icon in an interactive interface currently displayed on the display screen. Here, the first folder icon refers to an icon identifier of the first folder. The first folder may be any folder in the folders included in the desktop program.

Step 203: generating a call instruction in response to the first input operation. Here, the call instruction is used for starting a folder manager.

Step 204: starting the folder manager in response to the call instruction.

Step 205: obtaining all folders on the electronic apparatus under the folder manager. Here, when the electronic apparatus has a desktop program APP installed thereon, the desktop program will classify the icon identifiers (icons) of all the to-be-managed objects on the electronic apparatus in a form of folder. The icons of the to-be-managed objects on the electronic apparatus include icons of APP, folders, and files, etc. It should be noted that, when the desktop program is applied to the mobile phone and the tablet personal computer, the object to be managed by the desktop program is mainly the icon of the APP.

Step 206: putting all the folders in an unfolded state.

Step 207: displaying the folders in the unfolded state by the display screen in a queue manner.

Step 208: placing the first folder in the unfolded state as a first of the queue, when the folders in the unfolded state are displayed by the display screen in the queue manner. The queue is arranged in a Z-axis direction of the display screen.

Hereinafter, it will be introduced how the display screen displays the folders in the unfolded state in the queue manner in step 208, and FIG. 2-2 is a schematic diagram I of a queue manner of displaying according to the embodiment of the present disclosure. As shown in FIG. 2-2, it is assumed that the electronic apparatus includes five folders in total, names of the five folders are tool, social recreation, application recommendation, living and reading, respectively, and icons of the five folders are presented to the user in a queue sequentially from top to bottom. It is the icon of the tool folder that is firstly presented to the user under a current page. When the user slides up and down, the icon of the social recreation folder is placed in the forefront of the queue, and the icon of the tool folder is placed in the end of the queue, that is, the social recreation folder is presented to the user. If the user continues to slide up and down, the icon of the application recommendation folder is placed in the forefront of the queue, and the icon of the social recreation folder is placed in the end of the queue, that is, the application recommendation folder is presented to the user. Accordingly, the user can view all the way to a reading folder in a manner of sliding up and down.

Figures 2, 3:
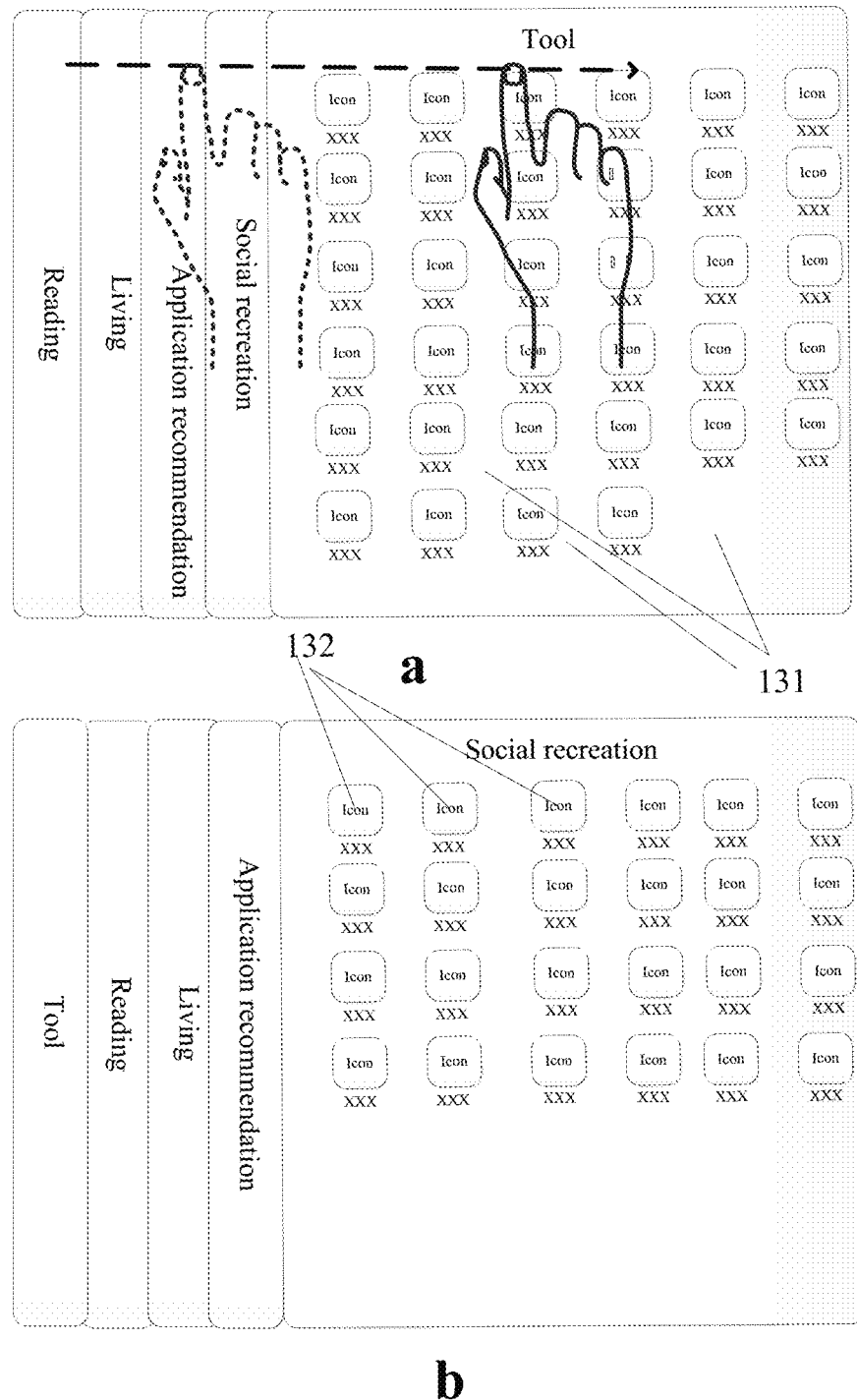

FIG. 2-3 is a schematic diagram II of the queue manner of displaying according to the embodiment of the present disclosure. As shown in FIG. 2-3, it is still assumed that the electronic apparatus includes five folders in total, names of the five folders are tool, social recreation, application recommendation, living and reading, respectively, and the five folders are presented to the user in a queue sequentially from left to right. It is the icon of the tool folder that is firstly presented to the user under a current page. When the user slides left and right (refer to diagram a of FIG. 2-3), the icon of the social recreation folder is placed in the forefront of the queue, and the icon of the tool folder is placed in the end of the queue (refer to diagram b of FIG. 2-3), that is, the social recreation folder is presented to the user. If the user continues to slide left and right, the icon of the application recommendation folder is placed in the forefront of the queue, and the icon of the social recreation folder is placed in the end of the queue, that is, the application recommendation folder is presented to the user. Accordingly, the user can view all the way to the reading folder in a manner of sliding left and right.

Figures 2, 3, 4:
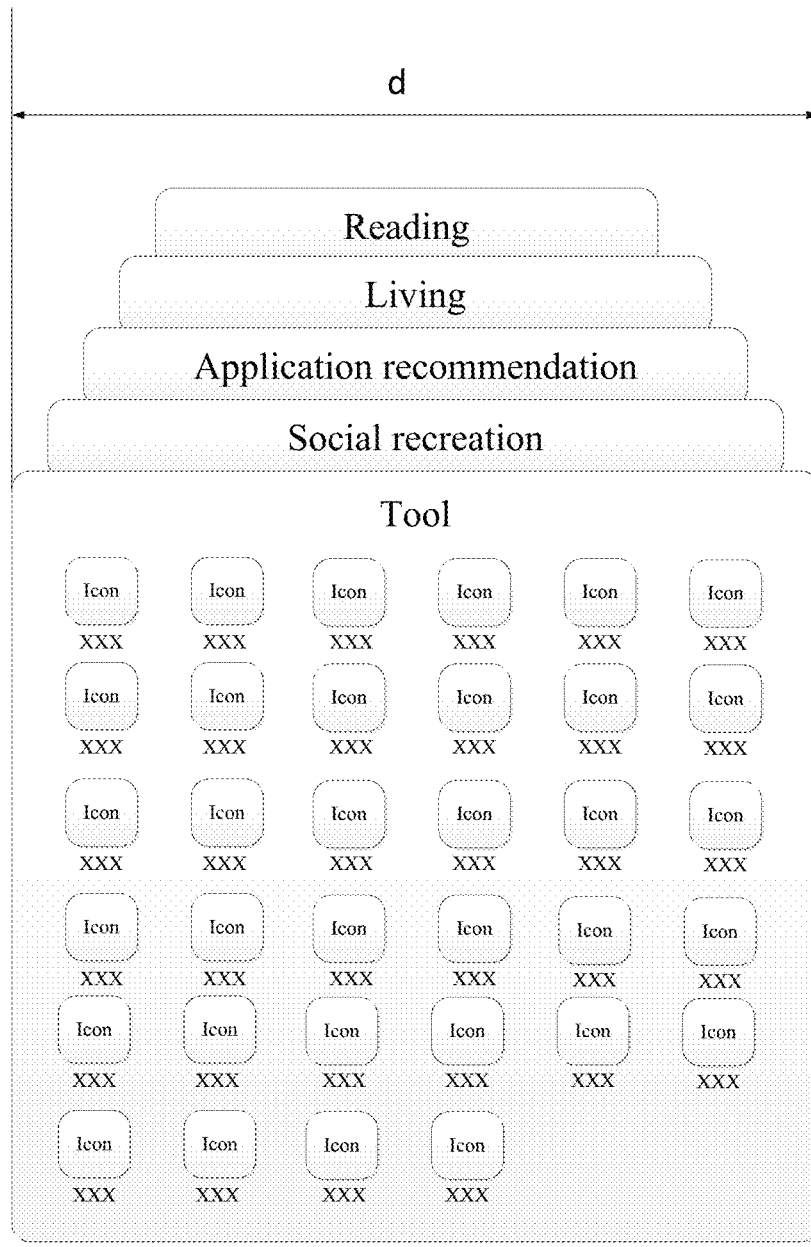
Figure 3:
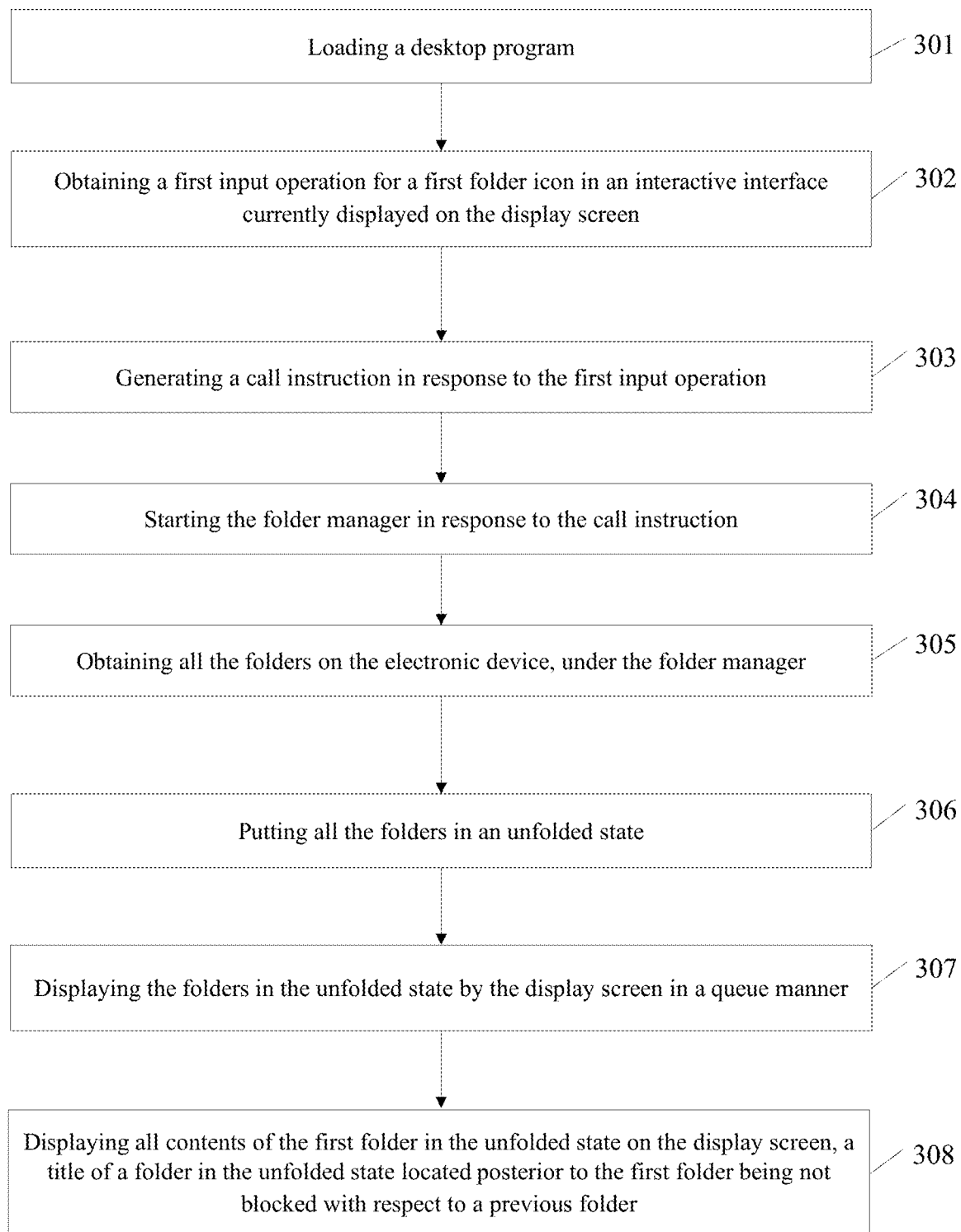
Figure 4:
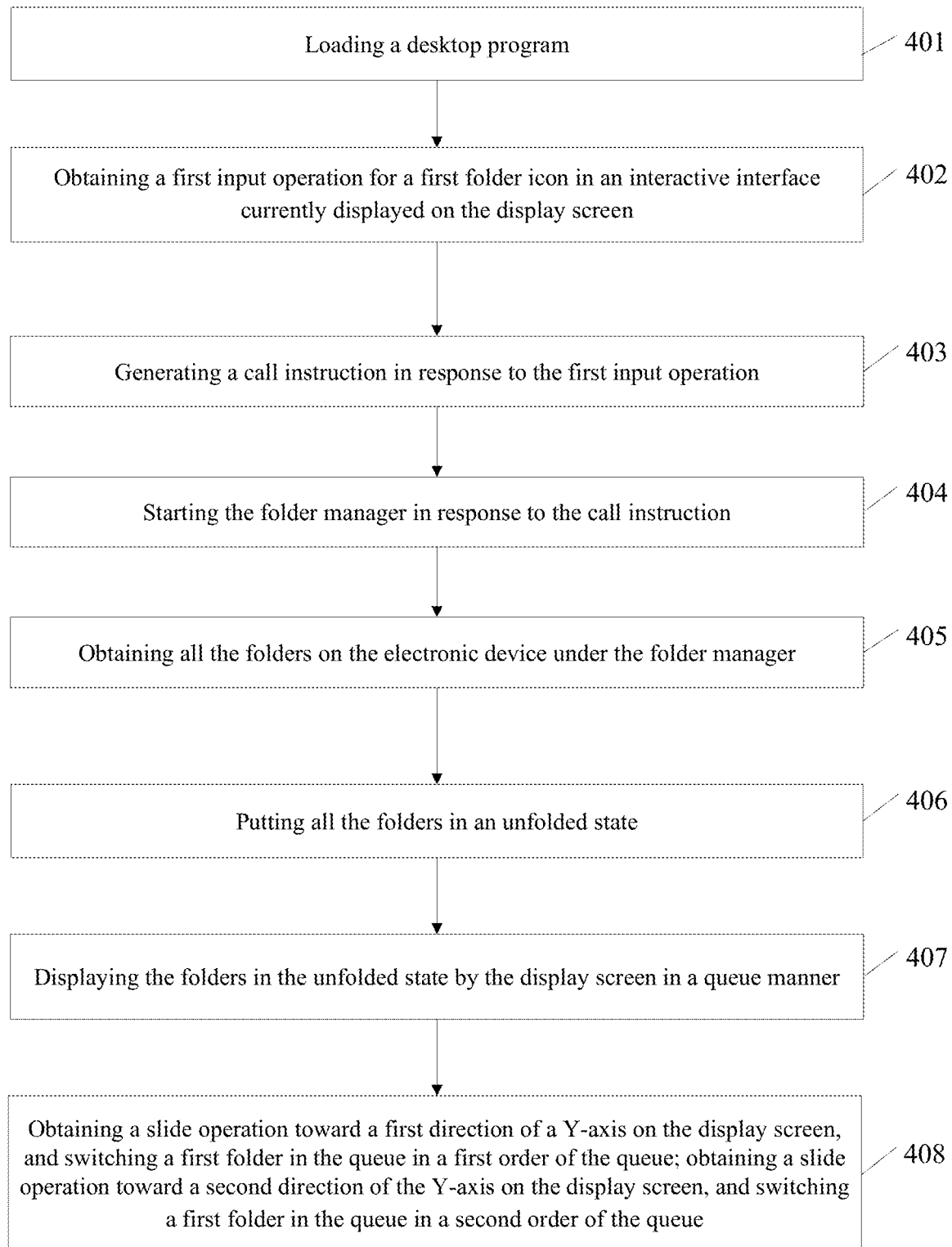

FIG. 2-4 is a schematic diagram III of the queue manner of displaying according to the embodiment of the present disclosure. As shown in FIG. 2-4, the five folders are presented to the user in the queue sequentially from top to bottom, and a difference is that a width of the folder in the end of the queue is smaller than a width of a previous folder. That is, in FIG. 2-4, a width of the icon of the social recreation folder is smaller than a width d of the icon of the tool folder, a width of the icon of the application recommendation folder is smaller than a width of the icon of the social recreation folder, a width of the icon of the living folder is smaller than a width of the icon of the application recommendation folder, and a width of the icon of the reading folder is smaller than a width of the icon of the living folder. In FIG. 2-2, the widths of all the folders in the queue are d; queue presentation manners shown in FIG. 2-4 and in FIG. 2-2 are same, both presenting the icons of the folders up and down. That is, under a Cartesian three-dimensional coordinate, the icons of the folders are all presented in the Z-axis direction, and a difference is that the presentation manner shown in FIG. 2-4 can better make the user feel that the folder icons extend in the Z-axis direction, which conforms more to that: in a three-dimensional space, even if actual sizes of all the objects are consistent, the farther the object away from the viewer, the smaller the size as felt by the user. In other words, the presentation manner shown in FIG. 2-4 is close to a feel of a real three-dimensional space.

It should be noted that, in FIG. 2-2 to FIG. 2-4, only the folder presented in the forefront is in an activated state, but folders behind it in the queue are in an inactivated state; what is presented by the folder in the inactivated state is only the icon of the folder, and the icon identifier under the folder is unavailable. For example, as shown in FIG. 1-2, when the social recreation folder is in the inactivated state, an icon of an application APP under the social recreation folder is unavailable, so that the user is unable to start the application APP under the social recreation folder. When the tool folder is in the activated state, an icon of an application APP under the tool folder is available, and thus, the user can start the application APP under the tool folder by a click operation.

Embodiment Three

Based on the aforesaid Embodiment Two, the embodiment of the present disclosure provides a display control method, which is applied to an electronic apparatus. A function realized by the display control method can be implemented by a processor in the electronic apparatus which calls program codes. Of course, the program codes can be stored in a computer storage medium. It can be seen that the electronic apparatus at least comprises a processor and a storage medium.

In the embodiment of the present disclosure, each folder within the interactive interface has a corresponding folder icon on the interactive interface. The call instruction is generated for the input operation for each of the folder icons.

FIG. 3 is a schematic implementation flowchart of a display control method according to Embodiment Three of the present disclosure. As shown in FIG. 3, the display control method comprises steps 301 to 308.

Step 301: loading a desktop program. Here, the desktop program includes an interactive interface, the interactive interface includes a plurality of folders, and the interactive interface is displayed by a display screen of the electronic apparatus.

Step 302: obtaining a first input operation for a first folder icon in an interactive interface currently displayed on the display screen. Here, the first folder icon refers to an icon identifier of the first folder. The first folder may be any folder in the folders included in the desktop program.

Step 303: generating a call instruction in response to the first input operation. Here, the call instruction is used for starting a folder manager.

Step 304: starting the folder manager in response to the call instruction.

Step 305: obtaining all folders on the electronic apparatus under the folder manager.

Here, when the electronic apparatus has a desktop program APP installed thereon, the desktop program will classify the icon identifiers (icons) of all the to-be-managed objects on the electronic apparatus in a form of folder. The icons of the to-be-managed objects on the electronic apparatus include icons of APP, folders, and files, etc. It should be noted that, when the desktop program is applied to the mobile phone and the tablet personal computer, the object to be managed by the desktop program is mainly the icon of the APP.

Step 306: putting all the folders in an unfolded state.

Step 307: displaying the folders in the unfolded state by the display screen in a queue manner.

Step 308: displaying all contents of the first folder in the unfolded state on the display screen. A title of a folder in the unfolded state located posterior to the first folder being not blocked with respect to a previous folder.

Hereinafter, it will be introduced how the display screen displays the folders in the unfolded state in the queue manner in step 308. FIG. 2-2 is a schematic diagram I of a queue manner of displaying according to the embodiment of the present disclosure. As shown in FIG. 2-2, it is assumed that the electronic apparatus includes five folders in total, names of the five folders are tool, social recreation, application recommendation, living and reading, respectively, and icons of the five folders are presented to the user in a queue sequentially from top to bottom. It is the icon of the tool folder that is firstly presented to the user under a current page. When the user slides up and down, the icon of the social recreation folder is placed in the forefront of the queue, and the icon of the tool folder is placed in the end of the queue, that is, the social recreation folder is presented to the user. If the user continues to slide up and down, the icon of the application recommendation folder is placed in the forefront of the queue, and the icon of the social recreation folder is placed in the end of the queue, that is, the application recommendation folder is presented to the user. Thus, the user can view all the way to the reading folder in a manner of sliding up and down.

FIG. 2-3 is a schematic diagram II of the queue manner of displaying according to the embodiment of the present disclosure. As shown in FIG. 2-3, it is still assumed that the electronic apparatus includes five folders in total, names of the five folders are tool, social recreation, application recommendation, living and reading, respectively, and the five folders are presented to the user in a queue sequentially from left to right. It is the icon of the tool folder that is firstly presented to the user under a current page. When the user slides left and right (refer to diagram a of FIG. 2-3), the icon of the social recreation folder is placed in the forefront of the queue, and the icon of the tool folder is placed in the end of the queue (refer to diagram b of FIG. 2-3), that is, the social recreation folder is presented to the user. If the user continues to slide left and right, the icon of the application recommendation folder is placed in the forefront of the queue, and the icon of the social recreation folder is placed in the end of the queue, that is, the application recommendation folder is presented to the user. Accordingly, the user can view all the way to the reading folder in a manner of sliding left and right.

FIG. 2-4 is a schematic diagram III of the queue manner of displaying according to the embodiment of the present disclosure. As shown in FIG. 2-4, the five folders are presented to the user in a queue sequentially from top to bottom, and a difference is that a width of the folder in the end of the queue is smaller than a width of a previous folder. That is, in FIG. 2-4, a width of the icon of the social recreation folder is smaller than a width d of the icon of the tool folder, a width of the icon of the application recommendation folder is smaller than a width of the icon of the social recreation folder, a width of the icon of the living folder is smaller than a width of the icon of the application recommendation folder, and a width of the icon of the reading folder is smaller than a width of the icon of the living folder. In FIG. 2-2, the widths of all the folders in the queue are d. Queue presentation manners shown in FIG. 2-4 and in FIG. 2-2 are same, both presenting the icons of the folders up and down. That is, under a Cartesian three-dimensional coordinate, the icons of the folders are all presented in the Z-axis direction, and a difference is that the presentation manner shown in FIG. 2-4 can better make the user feel that the folder icons extend in the Z-axis direction, which conforms more to that: in a three-dimensional space, even if actual sizes of all the objects are consistent, the farther the object away from the viewer, the smaller the size as felt by the user. In other words, the presentation manner shown in FIG. 2-4 is close to a feel of a real three-dimensional space.

It should be noted that, in FIG. 2-2 to FIG. 2-4, only the folder presented in the forefront is in an activated state, but folders behind it in the queue are in an inactivated state; what is presented by the folder in the inactivated state is only the icon of the folder, and the icon identifier under the folder is unavailable. For example, as shown in FIG. 1-2, when the social recreation folder is in the inactivated state, an icon of an application APP under the social recreation folder is unavailable, so that the user is unable to start the application APP under the social recreation folder. When the tool folder is in the activated state, an icon of an application APP under the tool folder is available, and thus, the user can start the application APP under the tool folder by a click operation.

Embodiment Four

Based on the aforesaid Embodiment One, the embodiment of the present disclosure provides a display control method, which is applied to an electronic apparatus. A function realized by the display control method can be implemented by a processor in the electronic apparatus which calls program codes. Of course, the program codes can be stored in a computer storage medium. It can be seen that the electronic apparatus at least comprises a processor and a storage medium.

FIG. 4 is a schematic implementation flowchart of a display control method according to Embodiment Four of the present disclosure. As shown in FIG. 4, the display control method comprises steps 401 to 408.

Step 401: loading a desktop program. Here, the desktop program includes an interactive interface, the interactive interface includes a plurality of folders, and the interactive interface is displayed by a display screen of the electronic apparatus. Here, the electronic apparatus may be such a type of fixed electronic apparatus as a Personal Computer (PC), or may be such a type of portable electronic apparatus as a personal digital assistant (PDA), a tablet personal computer and a handheld computer, and of course, may also be such a type of smart mobile terminal as a smart phone.

Step 402: obtaining a first input operation for a first folder icon in an interactive interface currently displayed on the display screen. Here, the first folder icon refers to an icon identifier of the first folder. The first folder may be any folder in the folders included in the desktop program. Here, the first input operation varies according to a type of the electronic apparatus. For example, when the electronic apparatus is an ordinary personal computer, and an input apparatus is a mouse, the first input operation may be a click operation on the display screen by a user through the mouse. When a display apparatus of the electronic apparatus is a touch display screen (for example, a smart phone, a tablet personal computer or a desktop computer uses the touch display screen), the first input operation may be a touch operation of an operating body, wherein the operating body includes a finger, a stylus and so on. It should be noted that, those skilled in the art may define a specific operation manner of the first input operation by themselves. For example, the first input operation may include an operation of clicking the first folder icon by the user through the mouse; for another example, the first input operation may be: an operation of touching the first folder icon by the user through a finger. In the specific implementation process, it may not be limited to the modes provided by the embodiment of the present disclosure, and those skilled in the art may implement the above-described first input operation by a variety of prior arts, which will not be described. As can be seen from the above description, in addition to the display screen, the electronic apparatus further has an input apparatus. When the electronic apparatus uses the touch display screen (touch screen), the input apparatus and the display screen of the electronic apparatus are combined into one.

Step 403: generating a call instruction in response to the first input operation. Here, the call instruction is used for starting a folder manager.

Step 404: starting the folder manager in response to the call instruction. Here, the folder manager is used for managing all folders on the electronic apparatus, and the content managed includes a state of a folder, and determining the number of icons which can be presented in the folder, a size of an icon, and so on. The state of a folder includes a foreground state and a background state. When the folder is in the foreground state, the folder is activated, and all the icon identifiers within the folder can be viewed by the user. When the folder is in the background state, the folder is inactivated; in other words, the folder is in a closed state. In the closed state, the user is unable to view the icon identifier under the folder.

Step 405: obtaining all the folders on the electronic apparatus under the folder manager. Here, when the electronic apparatus has a desktop program APP installed thereon, the desktop program will classify the icon identifiers (icons) of all to-be-managed objects on the electronic apparatus in a form of folder. The icons of the to-be-managed objects on the electronic apparatus include icons of APP, folders, and files, etc. It should be noted that, when the desktop program is applied to the mobile phone and the tablet personal computer, the object to be managed by the desktop program is mainly the icon of the APP.

Step 406: putting all the folders in an unfolded state.

Step 407: displaying the folders in the unfolded state by the display screen in a queue manner.

Step 408: obtaining a slide operation toward a first direction of a Y-axis on the display screen, and switching a first folder in the queue in a first order of the queue; obtaining a slide operation toward a second direction of the Y-axis on the display screen; and switching a first folder in the queue in a second order of the queue.

As shown in FIG. 2-2, it is assumed that the electronic apparatus includes five folders in total, names of the five folders are tool, social recreation, application recommendation, living and reading, respectively, and icons of the five folders are presented to the user in a queue sequentially from top to bottom. It is the icon of the tool folder that is firstly presented to the user under a current page. When the user slides up and down, the icon of the social recreation folder is placed in the forefront of the queue, and the icon of the tool folder is placed in the end of the queue, that is, the social recreation folder is presented to the user. If the user continues to slide up and down, the icon of the application recommendation folder is placed in the forefront of the queue, and the icon of the social recreation folder is placed in the end of the queue, that is, the application recommendation folder is presented to the user. Accordingly, the user can view all the way to a reading folder in a manner of sliding up and down.

As shown in FIG. 2-3, it is still assumed that the electronic apparatus includes five folders in total, names of the five folders are tool, social recreation, application recommendation, living and reading, respectively, and the five folders are presented to the user in a queue sequentially from left to right. It is the icon of the tool folder that is firstly presented to the user under a current page. When the user slides left and right (refer to diagram a of FIG. 2-3), the icon of the social recreation folder is placed in the forefront of the queue, and the icon of the tool folder is placed in the end of the queue (refer to diagram b of FIG. 2-3), that is, the social recreation folder is presented to the user. If the user continues to slide left and right, the icon of the application recommendation folder is placed in the forefront of the queue, and the icon of the social recreation folder is placed in the end of the queue, that is, the application recommendation folder is presented to the user. Accordingly, the user can view all the way to the reading folder in a manner of sliding left and right.

It can be seen that, the Y-axis varies according to different presentation manners of queuing of the folders, and a queuing direction of the folders is just a direction of the slide operation.

In the technical solution of the embodiment of the present disclosure, after all the folders on the display interface are unfolded, they are displayed by the display screen in the queue manner. When there are a large number of folders, the folders displayed in the queue manner are in a relatively good order, a user can conveniently select a desired application from the unfolded folders in the queue, and the user operates conveniently, which brings a good experience to the user. In the embodiment of the present disclosure, the user can implement selection of the folder by the slide operation in a queue direction.

Embodiment Five

Based on the aforesaid Embodiment One, the embodiment of the present disclosure provides a display control method, which is applied to an electronic apparatus. A function implemented by the display control method can be implemented by a processor in the electronic apparatus which calls program codes. Of course, the program codes can be stored in a computer storage medium. It can be seen that the electronic apparatus at least comprises a processor and a storage medium.

Figure 5:
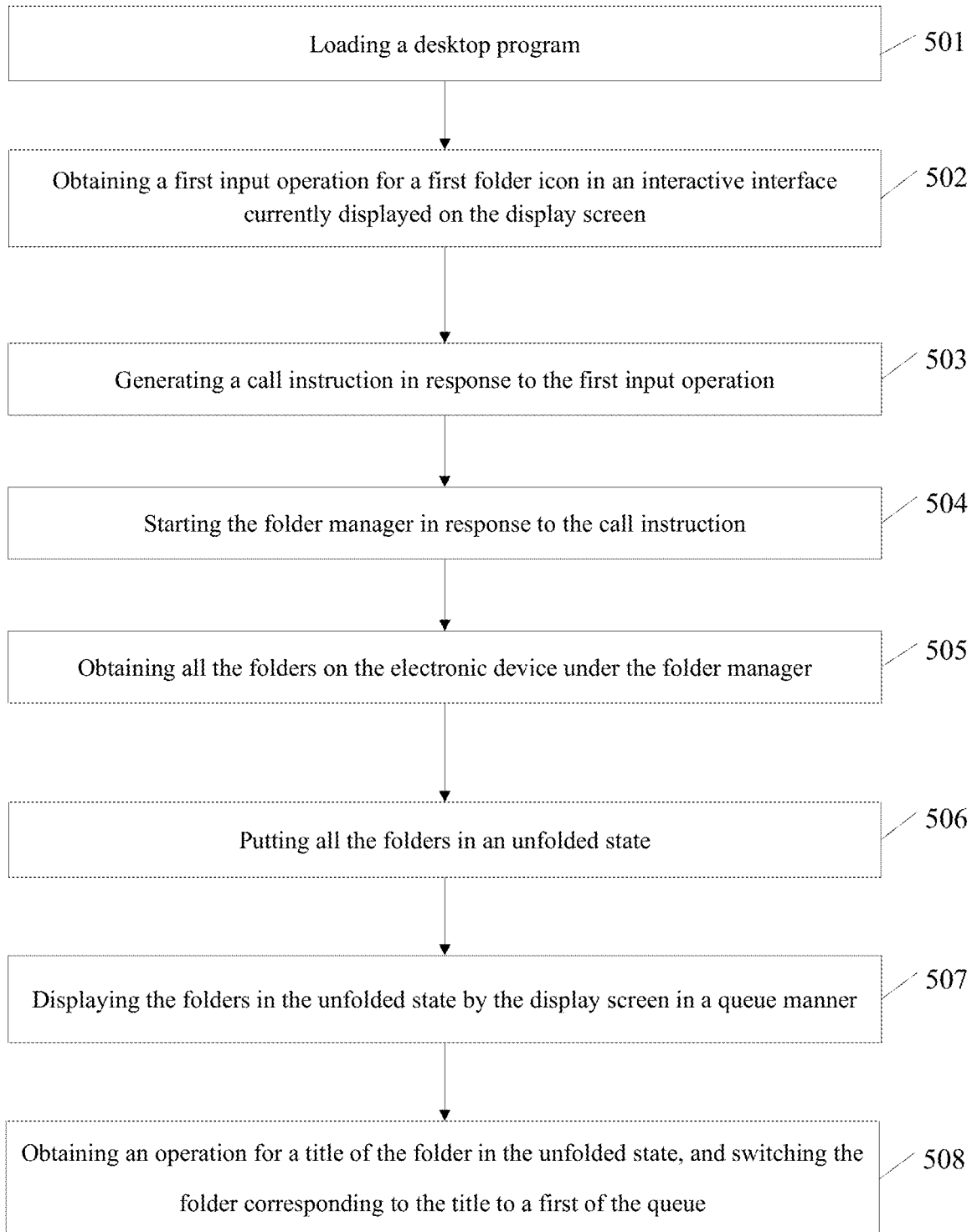
FIG. 5 is a schematic implementation flowchart of a display control method according to Embodiment Five of the present disclosure.

FIG. 5 is a schematic implementation flowchart of a display control method according to Embodiment Five of the present disclosure. As shown in FIG. 5, the display control method comprises steps 501 to 508.

Step 501: loading a desktop program. Here, the desktop program includes an interactive interface, the interactive interface includes a plurality of folders, and the interactive interface is displayed by a display screen of the electronic apparatus. The electronic apparatus may be such a type of fixed electronic apparatus as a Personal Computer (PC), or may be such a type of portable electronic apparatus as a personal digital assistant (PDA), a tablet personal computer and a handheld computer, and of course, may also be such a type of smart mobile terminal as a smart phone.

Step 502: obtaining a first input operation for a first folder icon in an interactive interface currently displayed on the display screen. Here, the first folder icon refers to an icon identifier of the first folder. The first folder may be any folder in the folders included in the desktop program.

Here, the first input operation varies according to a type of the electronic apparatus. For example, when the electronic apparatus is an ordinary personal computer, and an input apparatus is a mouse, the first input operation may be a click operation on the display screen by a user through the mouse. When a display apparatus of the electronic apparatus is a touch display screen (for example, a smart phone, a tablet personal computer or a desktop computer uses the touch display screen), the first input operation may be a touch operation of an operating body, wherein the operating body includes a finger, a stylus and so on. It should be noted that, those skilled in the art may define a specific operation manner of the first input operation by themselves. For example, the first input operation may include an operation of clicking the first folder icon by the user through the mouse; for another example, the first input operation may be: an operation of touching the first folder icon by the user through a finger. In the specific implementation process, it may not be limited to the modes provided by the embodiment of the present disclosure, and those skilled in the art may implement the above-described first input operation by a variety of prior arts, which will not be described. As can be seen from the above description, in addition to the display screen, the electronic apparatus further has an input apparatus. When the electronic apparatus uses the touch display screen (touch screen), the input apparatus and the display screen of the electronic apparatus are combined into one.

Step 503: generating a call instruction in response to the first input operation. Here, the call instruction is used for starting a folder manager.

Step 504: starting the folder manager in response to the call instruction.

Here, the folder manager is used for managing all folders on the electronic apparatus, and the content managed includes a state of a folder, and determining the number of icons which can be presented in the folder, a size of an icon, and so on.

The state of a folder includes a foreground state and a background state. When the folder is in the foreground state, the folder is activated, and all the icon identifiers within the folder can be viewed by the user. When the folder is in the background state, the folder is inactivated; in other words, the folder is in a closed state. In the closed state, the user is unable to view the icon identifier under the folder.

Step 505: obtaining all the folders on the electronic apparatus under the folder manager.

Here, when the electronic apparatus has a desktop program APP installed thereon, the desktop program will classify the icon identifiers (icons) of all to-be-managed objects on the electronic apparatus in a form of folder. The icons of the to-be-managed objects on the electronic apparatus include icons of APP, folders, and files, etc. It should be noted that, when the desktop program is applied to the mobile phone and the tablet personal computer, the object to be managed by the desktop program is mainly the icon of the APP.

Step 506: putting all the folders in an unfolded state.

Step 507: displaying the folders in the unfolded state by the display screen in a queue manner.

Step 508: obtaining an operation for a title of the folder in the unfolded state, and switching the folder corresponding to the title to a first of the queue.

Here, an operation can be performed directly on the title of the folder in the unfolded state. Thus, the folder corresponding to the title can be switched to the first of the queue, so as to quickly display all the contents of the folder required by the user in the forefront of the display interface, and other folders are located behind the folder corresponding to the title. Similarly, titles of the other folders are not blocked.

In the technical solution of the embodiment of the present disclosure, after all the folders on the display interface are unfolded, they are displayed by the display screen in the queue manner. When there are a large number of folders, the folders displayed in the queue manner are in a relatively good order. A user can conveniently select a desired application from the unfolded folders in the queue, and the user operates conveniently, which brings a good experience to the user. In the embodiment of the present disclosure, the user can implement selection of the folder by performing operation directly on the title of the folder.

Embodiment Six

Based on the aforesaid Embodiment One, the embodiment of the present disclosure further provides a display control device. A loading unit, a first obtaining unit, a first responding unit, a second responding unit, a second obtaining unit, a processing unit and a display unit as comprised in the device can all be implemented by a processor in the electronic apparatus. Of course, they can be implemented by a specific logic circuit; in a specific implementation process, the processor may be a Central Processing Unit (CPU), a Micro Processing Unit (MPU), a Digital Signal Processor (DSP) or a Field Programmable Gate Array (FPGA), and so on.

Figure 6:
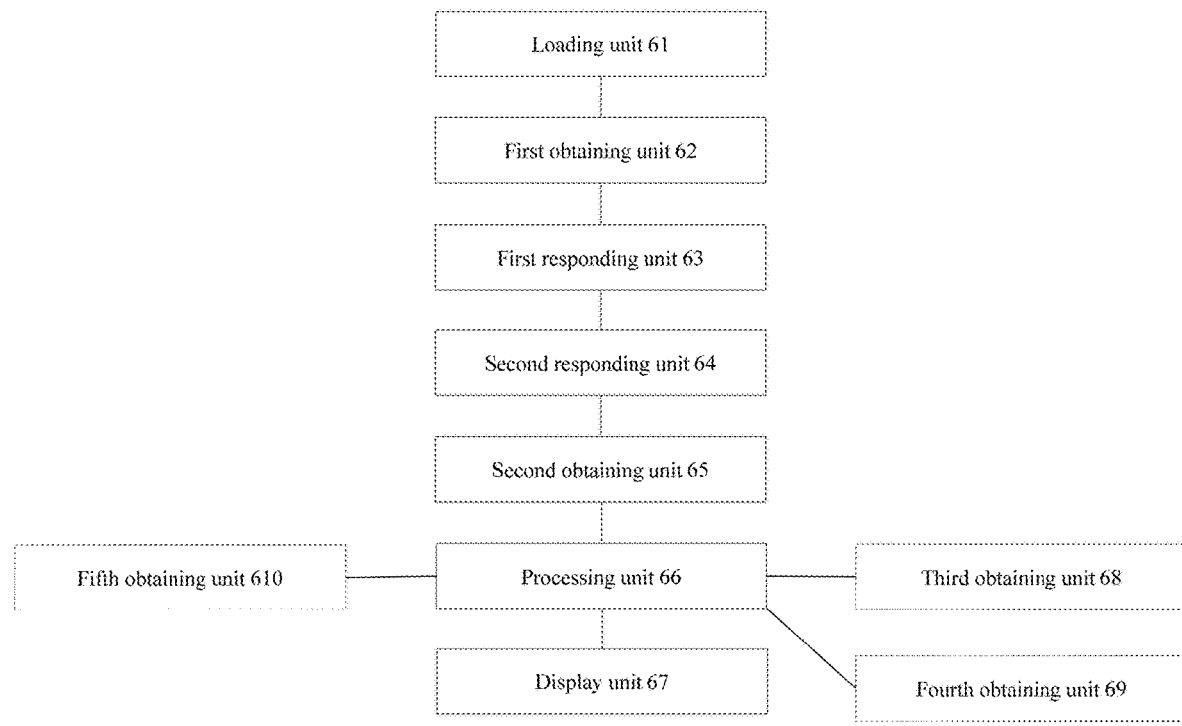
FIG. 6 is a schematic diagram of structural composition of a display control device according to Embodiment Six to Embodiment Ten of the present disclosure.

FIG. 6 is a schematic diagram of structural composition of a display control device according to Embodiment Six of the present disclosure. As shown in FIG. 6, the device comprises respective units as below.

A loading unit 61 loads a desktop program. The desktop program includes an interactive interface. The interactive interface includes a plurality of folders. The interactive interface is displayed by a display screen of the electronic apparatus.

A first obtaining unit 62 obtains an input operation for a first folder icon in an interactive interface currently displayed on the display screen.

A first responding unit 63 generates a call instruction in response to the input operation. The call instruction is used for starting a folder manager.

A second responding unit 64 starts the folder manager in response to the call instruction.

A second obtaining unit 65 obtains all folders on the electronic apparatus under the folder manager.

A processing unit 66 puts all the folders in an unfolded state.

A display unit 67 displays the folders in the unfolded state by the display screen in a queue manner.

Those skilled in the art should understand that, functions implemented by the respective units in the display control device shown in FIG. 6 can be understood with reference to relevant descriptions of the display control methods described above.

Embodiment Seven

Based on the aforesaid embodiments, the embodiment of the present disclosure further provides a display control device. A loading unit, a first obtaining unit, a first responding unit, a second responding unit, a second obtaining unit, a processing unit and a display unit as comprised in the device can all be implemented by a processor in the electronic apparatus. Of course, they can be implemented by a specific logic circuit. In a specific implementation process, the processor may be a Central Processing Unit (CPU), a Micro Processing Unit (MPU), a Digital Signal Processor (DSP) or a Field Programmable Gate Array (FPGA), and so on.

In the embodiment of the present disclosure, each folder within the interactive interface has a corresponding folder icon on the interactive interface. The call instruction is generated for the input operation for each of the folder icons.

With reference to FIG. 6, the device comprises respective units as below.

A loading unit 61 loads a desktop program. The desktop program includes an interactive interface. The interactive interface includes a plurality of folders. The interactive interface is displayed by a display screen of the electronic apparatus.

A first obtaining unit 62 obtains an input operation for a first folder icon in the interactive interface currently displayed on the display screen.

A first responding unit 63 generates a call instruction in response to the input operation. The call instruction is used for starting a folder manager.

A second responding unit 64 starts the folder manager in response to the call instruction.

A second obtaining unit 65 is used for obtaining all folders on the electronic apparatus under the folder manager.

A processing unit 66 puts all the folders in an unfolded state.

A display unit 67 displays the folders in the unfolded state by the display screen in a queue manner.

The display unit 67 is further used for placing the first folder in the unfolded state as a first of the queue, when the folders in the unfolded state are displayed by the display screen in the queue manner. The queue is arranged in a Z-axis direction of the display screen.

It should be noted that: description of the above device embodiments is similar to the description of the above method embodiments, and the device embodiments have advantageous effects similar to those of the method embodiments, which will not be described here. For technical details that are not disclosed in the device embodiments of the present disclosure, please refer to the description of the method embodiments of the present disclosure for understanding, which will not be described here in order to save space.

Embodiment Eight

Based on the aforesaid embodiments, the embodiment of the present disclosure further provides a display control device. A loading unit, a first obtaining unit, a first responding unit, a second responding unit, a second obtaining unit, a processing unit and a display unit as comprised in the device can all be implemented by a processor in the electronic apparatus. Of course, they can be implemented by a specific logic circuit; in a specific implementation process, the processor may be a Central Processing Unit (CPU), a Micro Processing Unit (MPU), a Digital Signal Processor (DSP) or a Field Programmable Gate Array (FPGA), and so on.

In the embodiment of the present disclosure, each folder within the interactive interface has a corresponding folder icon on the interactive interface. The call instruction is generated for the input operation for each of the folder icons.

With reference to FIG. 6, the device comprises respective units as below.

A loading unit 61 loads a desktop program. The desktop program includes an interactive interface. The interactive interface includes a plurality of folders. The interactive interface is displayed by a display screen of the electronic apparatus.

A first obtaining unit 62 obtains an input operation for a first folder icon in an interactive interface currently displayed on the display screen.

A first responding unit 63 generates a call instruction in response to the input operation. The call instruction is used for starting a folder manager;

A second responding unit 64 starts the folder manager in response to the call instruction.

A second obtaining unit 65 obtains all folders on the electronic apparatus under the folder manager.

A processing unit 66 puts all the folders in an unfolded state.

A display unit 67 displays the folders in the unfolded state by the display screen in a queue manner.

The display unit 67 is further used for placing the first folder in the unfolded state as a first of the queue, when the folders in the unfolded state are displayed by the display screen in the queue manner. The queue is arranged in a Z-axis direction of the display screen.

The display unit 67 is further used for displaying all contents of the first folder in the unfolded state on the display screen. A title of a folder in the unfolded state located posterior to the first folder is not blocked with respect to a previous folder.

It should be noted that: description of the above device embodiments is similar to the description of the above method embodiments, and the device embodiments have advantageous effects similar to those of the method embodiments, which will not be described here. For technical details that are not disclosed in the device embodiments of the present disclosure, please refer to the description of the method embodiments of the present disclosure for understanding, which will not be described here in order to save space.

Embodiment Nine

Based on the aforesaid embodiments, the embodiment of the present disclosure further provides a display control device. A loading unit, a first obtaining unit, a first responding unit, a second responding unit, a second obtaining unit, a processing unit, a display unit, a third obtaining unit and a fourth obtaining unit as comprised in the device can all be implemented by a processor in the electronic apparatus. Of course, they can be implemented by a specific logic circuit; and in a specific implementation process, the processor may be a Central Processing Unit (CPU), a Micro Processing Unit (MPU), a Digital Signal Processor (DSP) or a Field Programmable Gate Array (FPGA), and so on.

In the embodiment of the present disclosure, each folder within the interactive interface has a corresponding folder icon on the interactive interface. The call instruction is generated for the input operation for each of the folder icons.

With reference to FIG. 6, the device comprises respective units as below.

A loading unit 61 loads a desktop program. The desktop program includes an interactive interface. The interactive interface includes a plurality of folders. The interactive interface is displayed by a display screen of the electronic apparatus.

A first obtaining unit 62 obtains an input operation for a first folder icon in an interactive interface currently displayed on the display screen.

A first responding unit 63 generates a call instruction in response to the input operation. The call instruction is used for starting a folder manager.

A second responding unit 64 starts the folder manager in response to the call instruction.

A second obtaining unit 65 obtains all folders on the electronic apparatus under the folder manager.

A processing unit 66 puts all the folders in an unfolded state.

A display unit 67 displays the folders in the unfolded state by the display screen in a queue manner. The display unit 67 is further used for placing the first folder in the unfolded state as a first of the queue, when the folders in the unfolded state are displayed by the display screen in the queue manner. The queue is arranged in a Z-axis direction of the display screen. The display unit 67 is further used for displaying all contents of the first folder in the unfolded state on the display screen. A title of a folder in the unfolded state located posterior to the first folder is not blocked with respect to a previous folder.

A third obtaining unit 68 obtains a slide operation toward a first direction of a Y-axis on the display screen.

The display unit 67 further switches a first folder in the queue in a first order of the queue.

A fourth obtaining unit 69 obtains a slide operation toward a second direction of the Y-axis on the display screen, The display unit 67 further switches a first folder in the queue in a second order of the queue.

It should be noted that: description of the above device embodiments is similar to the description of the above method embodiments, and the device embodiments have advantageous effects similar to those of the method embodiments, which will not be described here. For technical details that are not disclosed in the device embodiments of the present disclosure, please refer to the description of the method embodiments of the present disclosure for understanding, which will not be described here in order to save space.

Embodiment Ten

Based on the aforesaid embodiments, the embodiment of the present disclosure further provides a display control device. A loading unit, a first obtaining unit, a first responding unit, a second responding unit, a second obtaining unit, a processing unit, a display unit and a fifth obtaining unit as comprised in the device can all be implemented by a processor in the electronic apparatus. Of course, they can be implemented by a specific logic circuit; and in a specific implementation process, the processor may be a Central Processing Unit (CPU), a Micro Processing Unit (MPU), a Digital Signal Processor (DSP) or a Field Programmable Gate Array (FPGA), and so on.

In the embodiment of the present disclosure, each folder within the interactive interface has a corresponding folder icon on the interactive interface. The call instruction is generated based on the input operation for each of the folder icons.

With reference to FIG. 6, the device comprises units as below.

A loading unit 61 loads a desktop program. The desktop program includes an interactive interface. The interactive interface includes a plurality of folders. The interactive interface is displayed by a display screen of the electronic apparatus.

A first obtaining unit 62 obtains an input operation for a first folder icon in an interactive interface currently displayed on the display screen.

A first responding unit 63 generates a call instruction in response to the input operation. The call instruction is used for starting a folder manager.

A second responding unit 64 starts the folder manager in response to the call instruction.

A second obtaining unit 65 obtains all folders on the electronic apparatus under the folder manager.

A processing unit 66 puts all the folders in an unfolded state.

A display unit 67 displays the folders in the unfolded state by the display screen in a queue manner.

The display unit 67 further places the first folder in the unfolded state as a first of the queue, when the folders in the unfolded state are displayed by the display screen in the queue manner. The queue is arranged in a Z-axis direction of the display screen.

The display unit 67 further displays all contents of the first folder in the unfolded state on the display screen. A title of a folder in the unfolded state located posterior to the first folder is not blocked with respect to a previous folder.

A fifth obtaining unit 610 obtains an operation for a title of the folder in the unfolded state.

The display unit 67 further switches the folder corresponding to the title to the first of the queue.

It should be noted that: description of the above device embodiments is similar to the description of the above method embodiments, and the device embodiments have advantageous effects similar to those of the method embodiments, which will not be described here. For technical details that are not disclosed in the device embodiments of the present disclosure, please refer to the description of the method embodiments of the present disclosure for understanding, which will not be described here in order to save space.

Embodiment Eleven

Figure 7:
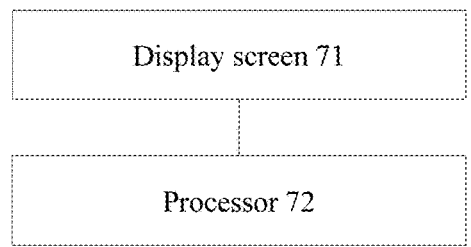
FIG. 7 is a schematic diagram of structural composition of an electronic apparatus according to Embodiment Eleven of the present disclosure.

As shown in FIG. 7, the embodiment of the present disclosure further provides an electronic apparatus, the electronic apparatus comprising: a display screen 71 and a processor 72.

The processor 72 loads a desktop program, the desktop program including an interactive interface. The interactive interface includes a plurality of folders. The interactive interface is displayed by a display screen 71 of the electronic apparatus. The processor 72 obtains an input operation for a first folder icon in an interactive interface currently displayed on the display screen 71, generates a call instruction in response to the input operation, the call instruction being used for starting a folder manager, and starts the folder manager in response to the call instruction. Under the folder manager, the processor 72 obtains all folders on the electronic apparatus, puts all the folders in an unfolded state, and displays the folders in the unfolded state by the display screen 71 in a queue manner.

The technical solutions recited in the embodiments of the present disclosure may be arbitrarily combined for use without conflict, or part of the composition units may also be omitted. For example, in FIG. 6, the loading unit 61 may be omitted.

Figure 8:
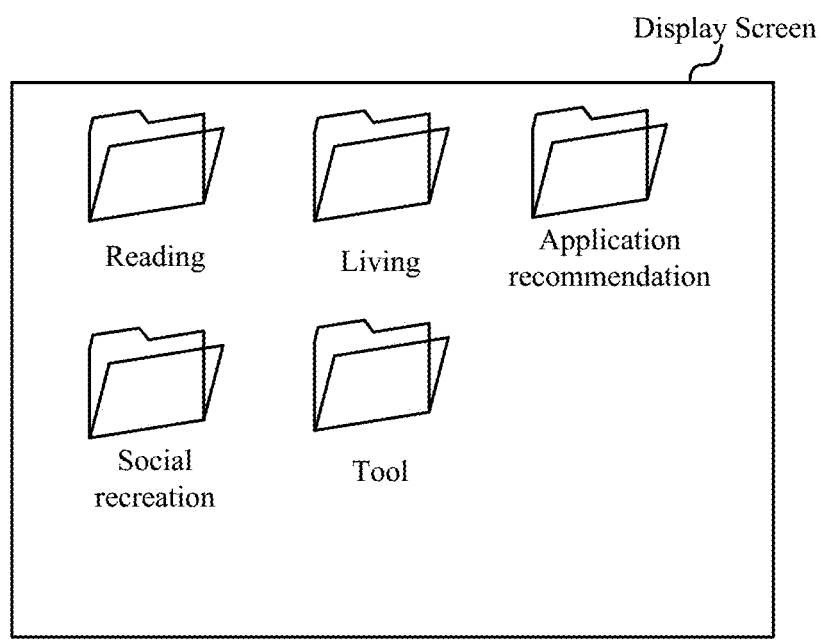
FIG. 8 schematically illustrates an application scenario according to an embodiment of the present disclosure.

FIG. 8 schematically illustrates an application scenario according to an embodiment of the present disclosure. As shown in FIG. 8, a plurality of folders are displayed on the display screen of the electronic apparatus. The plurality of folders are specifically a reading folder, a living folder, an application recommendation folder, a social recreation folder and a tool folder. Under each folder, there may be included one or more icon identifiers. For example, under the social recreation folder, there may be included icon identifiers representing files or applications, for example, icon identifiers of "Baidu Map", "CTRP", "QQLive", "TADU.COM", "iReader", video files and so on. When each folder is opened, respective icon identifiers are displayed as display contents of the folder. In FIG. 8, respective folders are displayed in a thumbnail mode. This is only an example, and the respective folders may further be displayed in manners of icon, tile, and so on.

Because there are a large number of icon identifiers under the respective folders, icon identifiers under a specific folder may be displayed on two pages, three pages or more pages. When browsing the folders, a user needs to switch between different display pages under different folders and a specific folder, which results in a lower browsing speed. In the embodiment of the present disclosure, there is provided a technical solution which enables quick browse of contents under the respective folders.

Embodiment Twelve

Figure 9:
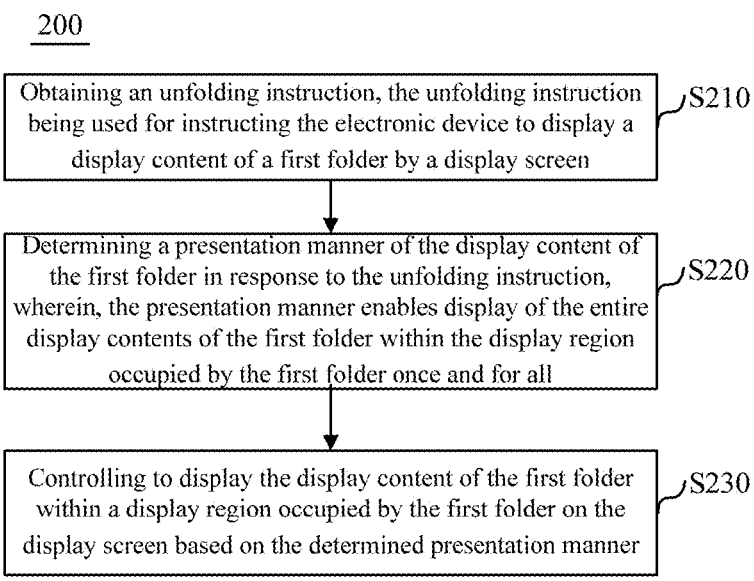
FIG. 9 schematically illustrates a flow chart of a first display control method according to an embodiment of the present disclosure.

FIG. 9 schematically illustrates a flow chart of a first display control method 200 according to an embodiment of the present disclosure. As shown in FIG. 9, the first display control method 200 may comprise: obtaining an unfolding instruction, the unfolding instruction being used for instructing the electronic apparatus to display a display content of a first folder by a display screen (S210); determining a presentation manner of the display content of the first folder in response to the unfolding instruction (S220); controlling to display the display content of the first folder within a display region occupied by the first folder on the display screen based on the determined presentation manner (S230), wherein, the presentation manner enables display of entire display contents of the first folder within the display region occupied by the first folder once and for all.

In S210, the unfolding instruction may be obtained in various modes. For example, the unfolding instruction may be obtained when the first folder is clicked, or the unfolding instruction is generated when the user receives a voice instruction of opening the first folder. A specific manner of obtaining the unfolding instruction does not constitute a limitation to the embodiments of the present disclosure. The unfolding instruction is used for instructing the electronic apparatus to display the display content of the first folder by the display screen. The first folder may be any one of the plurality of folders in the electronic apparatus, and for example, is any one of the plurality of folders as shown in FIG. 8, which is not limited to a certain folder.

In S220, the presentation manner of the display content of the first folder is determined in response to the unfolding instruction, and the presentation manner enables display of the entire display contents of the first folder within the display region occupied by the first folder once and for all. As an example, in response to the unfolding instruction, the presentation manner may be determined based on at least one of the number of the icon identifiers in the first folder and an area of the display region occupied by the first folder. In a case where the display region occupied by each folder is fixed, the presentation manner may be determined only based on the number of the icon identifiers of the first folder.

Two display modes for displaying the icon identifiers in the folder may be set, including a normal display mode and a thumbnail display mode. In the normal display mode, each icon identifier in the first folder is displayed in a default size, and spaces between the respective icon identifiers in the first folder are all default as well. In the thumbnail display mode, as compared with the normal display mode, the respective icon identifiers in the first folder are zoomed out, and the spaces between the respective icon identifiers are also reduced. For example, a few reduced scales may be set corresponding to the number of the icon identifiers in the first folder. The larger the number of the icon identifiers, the greater the reduced scale; and the smaller the number of the icon identifiers, the less the reduced scale.

As an example, when the number of the icon identifiers in the first folder is smaller than 9, the normal display mode is determined as the presentation manner for displaying the display contents of the first folder; when the number of the icon identifiers in the first folder is larger than 9 and smaller than 16, the thumbnail display mode is determined as the presentation manner for displaying the display contents of the first folder, and the reduced scale is set as $9/16=0.5625$ with respect to the normal display mode; when the number of the icon identifiers in the first folder is larger than 16 and smaller than 25, the thumbnail display mode is determined as the presentation manner for displaying the display contents of the first folder, and the reduced scale is set as $9/25=0.36$ with respect to the normal display mode, and so on. That is to say, the respective presentation manners may be set in advance, and a relationship between the number of the icon identifiers in the first folder and the respective presentation manners is determined; in S220, the presentation manner is determined directly according to the number of the icon identifiers in the first folder. Hereinafter, another example of determining the presentation manner is described in conjunction with FIG. 10.

Figure 10:
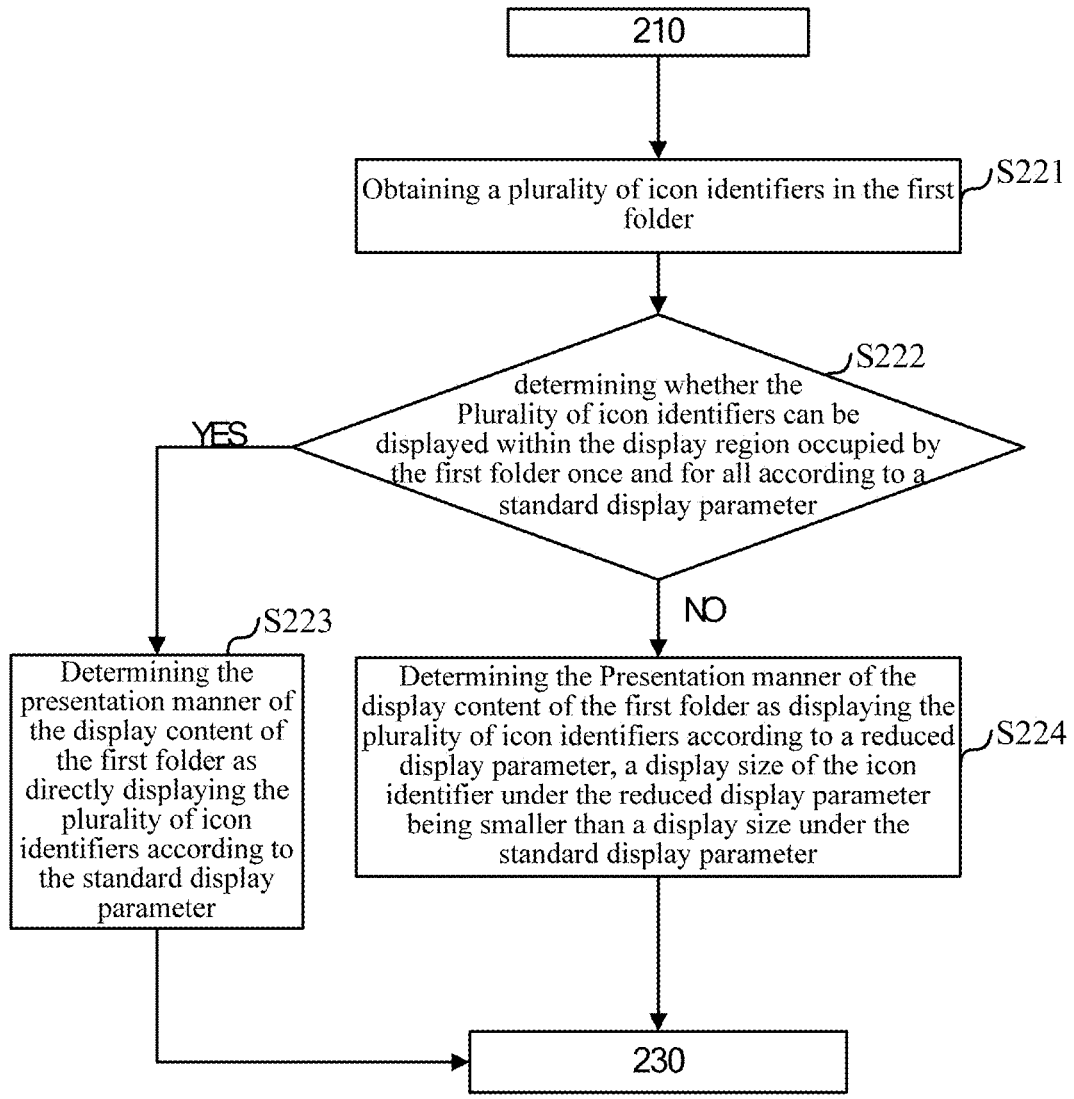
FIG. 10 schematically illustrates a flow chart of determining a presentation manner in the first display control method in FIG. 8.

FIG. 10 schematically illustrates a flow chart of determining the presentation manner in the first display control method in FIG. 9. As shown in FIG. 10, the determining the presentation manner of the display content of the first folder (S220) may include: obtaining a plurality of icon identifiers in the first folder (S221); determining whether the plurality of icon identifiers can be displayed within the display region occupied by the first folder once and for all according to a standard display parameter (S222); determining the presentation manner of the display content of the first folder as directly displaying the plurality of icon identifiers according to the standard display parameter, when the plurality of icon identifiers can be displayed completely within the display region occupied by the first folder once and for all according to the standard display parameter (YES in S222) (S223); determining the presentation manner of the display content of the first folder as displaying the plurality of icon identifiers according to a reduced display parameter, when the plurality of icon identifiers cannot be displayed completely within the display region occupied by the first folder once and for all according to the standard display parameter (NO in S222), a display size of the icon identifier under the reduced display parameter being smaller than a display size under the standard display parameter (S224).

In the example of the determining the presentation manner in FIG. 10, the icon identifiers as included in the first folder are determined by S211, so that the display content to be displayed can be determined. The standard display parameter used in S222 is, for example, a size of each icon identifier, or a maximum display number of the icon identifiers displayed on one display page. Based on the standard display parameter and the display content determined in S211, it can be determined whether all the icon identifiers in the first folder can be displayed within the display region occupied by the first folder once and for all. For example, assuming that it is determined that there are 10 icon identifiers under the first folder in S221, and the standard display parameter indicates that each icon identifier occupies ⅛ of the display region of the first folder, then it is determined in S222 that all the icon identifiers in the first folder cannot be displayed within the display region occupied by the first folder once and for all; if the standard display parameter indicates that each icon identifier occupies 1/16 of the display region of the first folder, then it is determined in S222 that all the icon identifiers in the first folder can be displayed within the display region occupied by the first folder once and for all. If all the icon identifiers in the first folder can be displayed once and for all, then in S223, the standard display parameter is determined as the presentation manner. If all the icon identifiers in the first folder cannot be displayed once and for all, then in S224, the reduced display parameter is set to reduce a display size of each icon identifier with respect to the standard display parameter, so that the entire display contents of the first folder can be displayed within the display region occupied by the first folder once and for all. The reduced display parameter may be variably set based on the icon identifiers included in the first folder as determined in S221.

In S230, it is controlled to display the display content of the first folder within the display region occupied by the first folder on the display screen, based on the determined presentation manner. The presentation manner as determined in S220 enables display of the entire display contents of the first folder within the display region occupied by the first folder once and for all, and thus, in S230, even if there are a large number of icon identifiers in the first folder, the entire display contents therein can be displayed once and for all. Thus, the user can browse all the icon identifiers under the first folder, without turning to other pages.

Figure 11A:
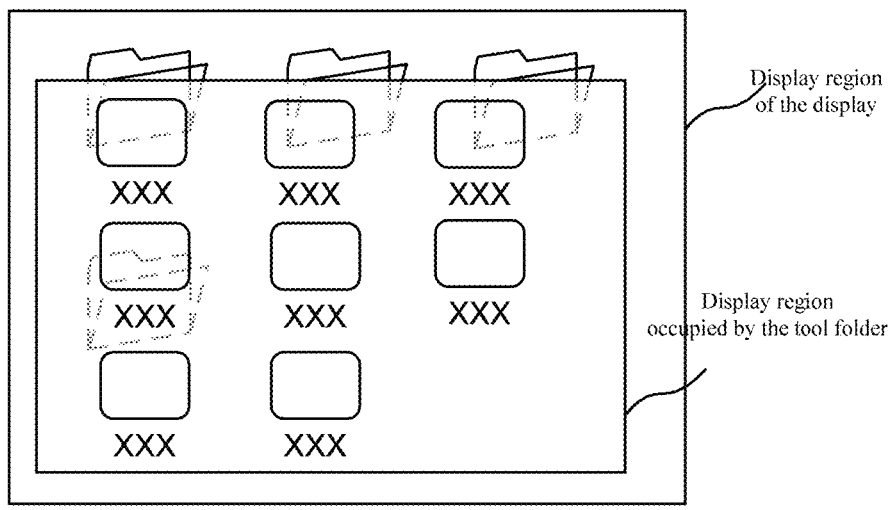
FIG. 11($a$) schematically illustrates a folder presentation example under a first presentation manner.

FIG. 11(a) schematically illustrates a folder presentation example under a first presentation manner. As shown in FIG. 11(a), the electronic apparatus comprises five folders, of which four folders include three folders partly shown by dotted lines located on top of a display and one folder entirely shown by a dotted line located in the middle, and another is a tool folder already opened including eight icon identifiers, that is, the first folder above. The display region occupied by the tool folder is part of the display region of the display, but not all of it. In FIG. 11(a), the eight icon identifiers in the tool folder can be displayed within a display region occupied by the tool folder once and for all according to the standard display parameter, and thus, the presentation manner of display contents of the tool folder is directly displaying the plurality of icon identifiers according to the standard display parameter.

Figure 11B:
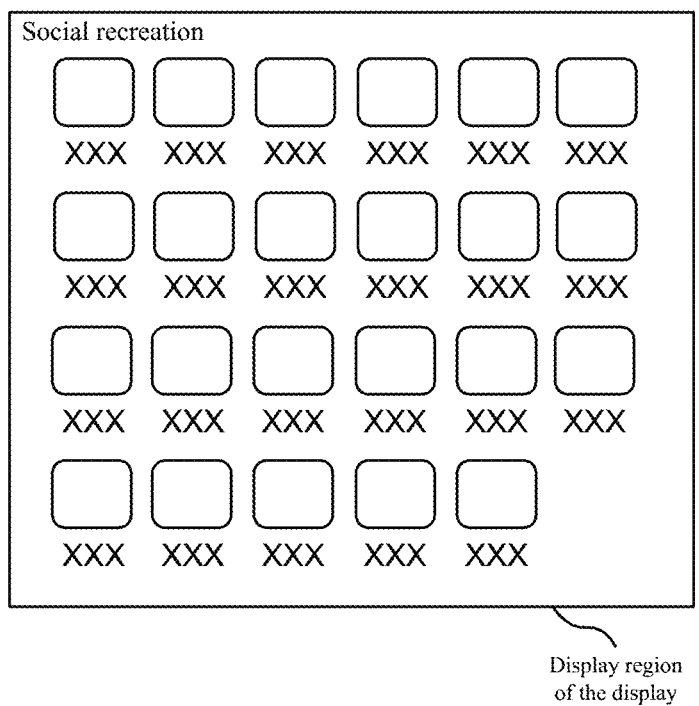

FIG. 11(b) schematically illustrates a folder presentation example under a second presentation manner. As shown in FIG. 11(a), what are displayed are display contents under a social recreation folder. The social recreation folder is one of the plurality of folders in the electronic apparatus, and other folders in the electronic apparatus are not shown. The display region occupied by the social recreation folder is the entire display region of the display. In FIG. 11(b), 23 icon identifiers therein cannot be displayed completely within the display region occupied by the social recreation folder according to the standard display parameter used in FIG. 11(a), and thus, the presentation manner of the display contents of the social recreation folder is displaying the 23 icon identifiers according to the reduced display parameter, so that the entire display contents of the social recreation folder can be displayed once and for all. It should be noted that, the display region occupied by the social recreation folder may be variable, and for example, in FIG. 11(b), the display region occupied by the social recreation folder may also be part of the entire display region of the display as in FIG. 11(a). Therefore, when the reduced display parameter is set, it is necessary to set the parameter in consideration of both the entire icon identifiers in the social recreation folder and the display region occupied by the social recreation folder.

In the technical solution of the display control method according to the embodiment of the present disclosure, for any folder in the electronic apparatus, the entire display contents therein can be displayed in the display region occupied by the folder once and for all, so as to collectively display the display contents of the respective folders, and facilitate the user to browse and operate the display contents.

Embodiment Thirteen

Figure 12:
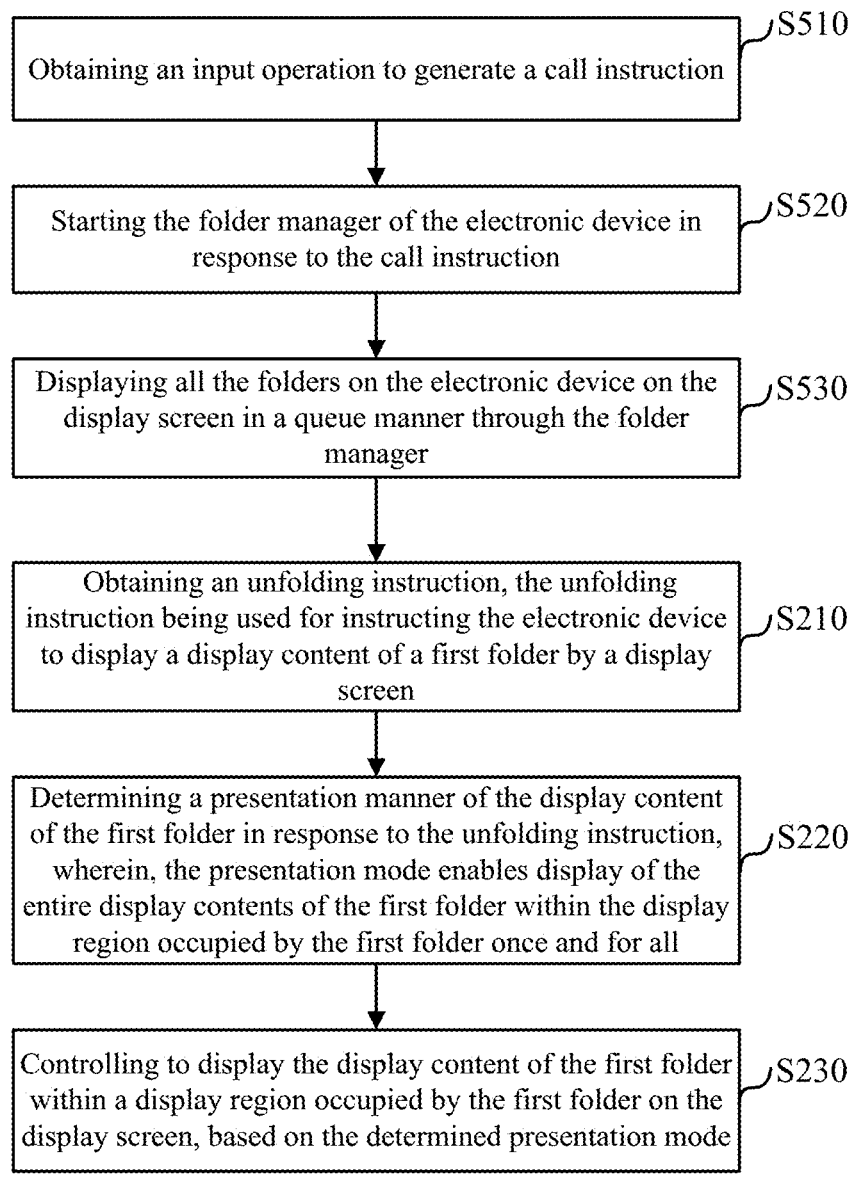
FIG. 12 schematically illustrates a flow chart of a second display control method according to an embodiment of the present disclosure.

FIG. 12 schematically illustrates a flow chart of a second display control method 500 according to an embodiment of the present disclosure. In FIG. 12, same reference signs are used for identifying steps same as those in FIG. 9. Steps S210, S220 and S230 in the second display control method 500 in FIG. 12 are same as the corresponding steps in the first display control method 200 in FIG. 9, and the above description in conjunction with FIGS. 9 to 11 can be referred to. The second display control method 500 in FIG. 12 differs from the first display control method 200 in FIG. 9 in that S510, S520 and S530 are further added.

In S510, an input operation is obtained to generate a call instruction. The call instruction is used for calling the folder manager in the electronic apparatus. The folder manager is an application module in the electronic apparatus used for managing respective folders of the electronic apparatus, and the application module may be set in an operating system of the electronic apparatus, and may also be a dedicated application program, which can be implemented by program codes run by a processor. Via the folder manager, the user can perform at least one of operations as follows: deleting an existing folder in the electronic apparatus, adding a folder to the electronic apparatus, controlling a display manner of the existing folder, or modifying a name of the folder. The input operation is, for example, a click operation for a specific folder, or an enable operation for the icon identifier of the folder manager. That is to say, in S510, the call instruction for calling the folder manager is generated in response to the input operation.

In S520, the folder manager of the electronic apparatus is started in response to the call instruction. For example, a start signal is transmitted to the folder manager according to the call instruction, to open the folder manager.

In S530, all the folders on the electronic apparatus are displayed on the display screen in a queue manner via the folder manager. For example, the user may need to browse all the folders in the electronic apparatus to find a desired icon identifier. At this time, all the folders on the electronic apparatus are displayed on the display screen in the queue manner, so that the user can quickly learn an overall situation of the folders in the electronic apparatus, in order to find the desired icon identifier.

For example, when the user expects to find the "iReader" icon, he/she may not know a specific folder in which the "iReader" icon is located. By using the steps S510 to S530, when all the folders on the electronic apparatus are displayed on the display screen in the queue manner, the user may speculate that "iReader" is located in the social recreation folder according to the name of the folder, so as to quickly locate a position thereof. Then, the user clicks on the social recreation folder to obtain an unfolding instruction, i.e., S210, and to display all the icon identifiers therein in the display region occupied by the social recreation folder once and for all through operations of S220 and S230, and thus, the user can quickly find the "iReader" icon without turning to other pages.

Figure 13:
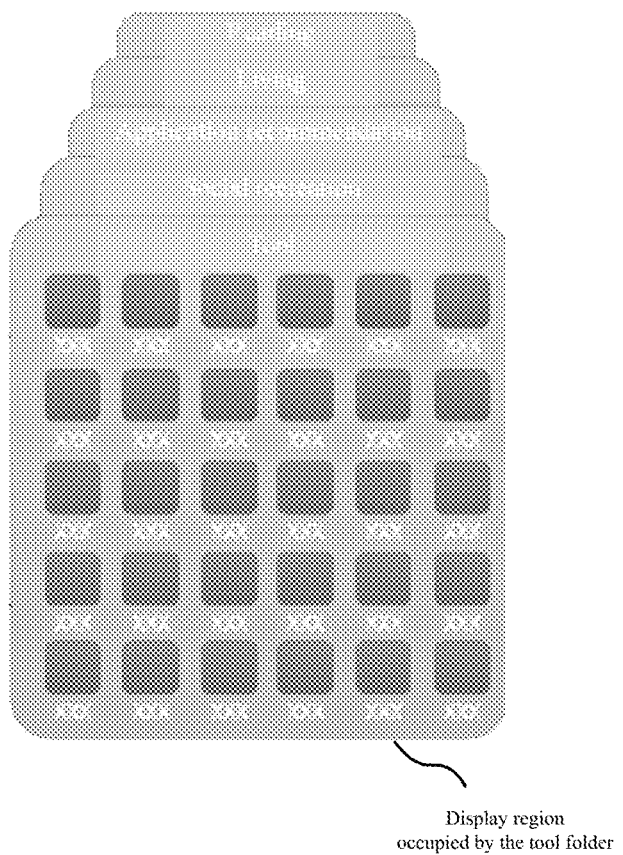
FIG. 13 schematically illustrates a folder display example under the second display control method.

FIG. 13 schematically illustrates a folder display example under the second display control method 500. As shown in FIG. 13, all the five folders in FIG. 8 are displayed in the queue manner. In the queue manner, all the folders in the electronic apparatus and their names may be displayed. Thus, the user can speculate a target folder in which the desired icon identifier is located according to the name of the folder, and for example, may quickly view whether the desired icon identifier is in the target folder by clicking on the target folder. A switch operation may be performed under all the folders displayed, until the desired icon identifier is found.

In addition, S530 may further include making each folder in all the folders in the queue to be in the unfolded state, so that each folder can be browsed more quickly. At this time, each folder may be displayed based on the standard display parameter firstly. Thereafter, for example, when the user clicks on the first folder, a presentation instruction used for the first folder is obtained (S210). The entire display contents of the first folder may be displayed within the display region occupied by the first folder once and for all, by using S220 and S230.

With further reference to FIG. 13, each of the five folders occupies a corresponding square display region, a tool display region occupied by the tool folder is a display region including 30 icon identifiers in FIG. 13, and the 30 icon identifiers are the entire display contents in the tool folder, and are displayed once and for all. A social recreation display region occupied by the social recreation folder is partly covered by the tool display region, and the icon identifier thereof (not shown) is displayed in the social recreation display region according to the standard display parameter. An application recommendation display region occupied by the application recommendation folder is partly covered by the social recreation display region, and all the icon identifiers (not shown) therein are displayed in the application recommendation display region according to the standard display parameter. It is also similar for the living folder and the reading folder. When the user wants to switch from the currently displayed tool folder to the social recreation folder, S210 is triggered based on a switch operation to obtain a presentation instruction for the social recreation folder, and the social recreation folder is displayed in a position of the tool folder in FIG. 13 by using S220 and S230, and the entire display contents of the social recreation folder are displayed once and for all. Thus, the user can view the entire display contents under each folder once and for all by switching under the respective folders, so as to accelerate a browsing speed.

Embodiment Fourteen

Figure 14:
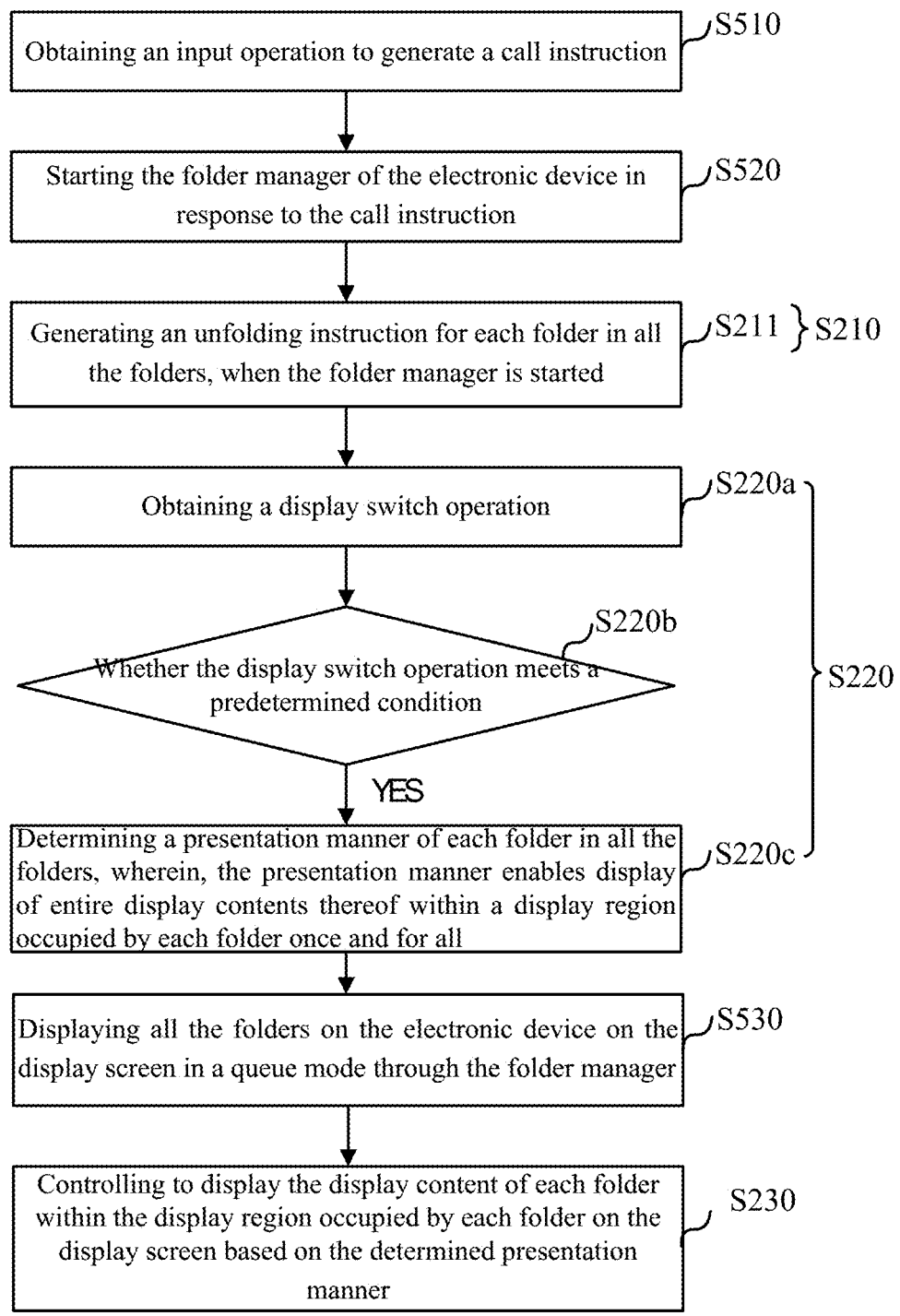
FIG. 14 schematically illustrates a flow chart of a third display control method according to an embodiment of the present disclosure.

FIG. 14 schematically illustrates a flow chart of a third display control method 700 according to an embodiment of the present disclosure. In FIG. 14, same reference signs are used for identifying steps same as those in FIG. 12. Steps S510, S520, S530 and S230 in the third display control method 700 in FIG. 14 are same as the corresponding steps in the second display control method 500 in FIG. 12, and the above description in conjunction with FIGS. 9 to 12 can be referred to. The third display control method 700 in FIG. 14 differs from the second display control method 500 in FIG. 12 in operations of S210 and S220, and a position of S530.

As shown in FIG. 14, S210 includes: generating an unfolding instruction for each folder in all the folders, while a folder manager of the electronic apparatus is started in S520 (S211). This, as shown in FIG. 13, enables each of all the folders to be in an unfolded state, to facilitate the user to browse and view.

S220 in FIG. 14 includes S220a, S220b and S220c.

In S220a, a display switch operation is obtained. The display switch operation is, for example, a click operation by the user on different folders. For example, when the display displays a tool folder, if a social recreation folder is clicked, then the operation of clicking the social recreation folder is a display switch operation. Alternatively, in a case where a display screen is a touch screen, the display switch operation may also be a slide operation on the display. For example, when the user expects to quickly browse respective folders on respective electronic apparatuses, he/she may perform slide operations on the touch screen to quickly switch between the respective folders. When sliding speeds of the slide operations are different, display switch speeds among the folders are usually different.

In S220a, it is determined whether the display switch operation meets a predetermined condition. When the display switch operation meets the predetermined condition (YES in S220a), a presentation manner of each folder in all the folders is determined, and the presentation manner enables display of entire display contents thereof within a display region occupied by each folder once and for all (S220c). When the display switch operation does not meet the predetermined condition (NO in S220a), the display contents of the respective folders are displayed according to a standard display parameter.

The predetermined condition is, for example, a slide operation of the display switch operation on the touch screen. When the user's finger slides on the touch screen to perform display switch, the user may need to browse the display content in the folder more quickly, and accordingly it may be necessary to display the entire display contents under the folder once and for all for each folder, so as to determine the presentation manner thereof for each folder in S220c.

Alternatively, the predetermined condition may also be that a sliding speed of the slide operation as the display switch operation is larger than a predetermined speed value. When the user's finger quickly slide on the touch screen to perform display switch, the faster the sliding speed, usually the faster the speed of browsing the respective folders. Accordingly, when the sliding speed of the slide operation is larger than the predetermined speed value, a need to quickly browse the display contents in the folder can be determined, so that for each folder, it is necessary to display the entire display contents of the folder once and for all, and accordingly, the presentation manner thereof is determined for each folder in S220c, to enable display of the entire display contents of each folder within the display region occupied by each folder once and for all.

As shown in FIG. 14, when the presentation manner of each folder is determined in S220c, in S530 all the folders on the electronic apparatus are displayed on the display screen in a queue manner via the folder manager, and in S230 it is controlled to display the display content of each folder within the display region occupied by each folder on the display screen based on the determined presentation manner. Here, although S530 is illustrated prior to S230, yet both may be simultaneously performed.

Figure 15A:
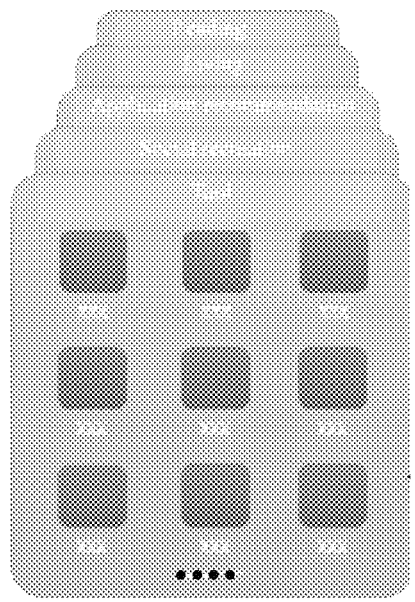
FIG. 15(a) schematically illustrates a first example of folder display under the third display control method.

FIG. 15(a) schematically illustrates a first example of folder display under the third display control method. FIG. 15(a) is a display example when the display switch operation does not meet the predetermined condition, wherein, each folder is displayed according to the standard display parameter. As shown in FIG. 15(a), each of the five folders occupies a corresponding square display region, and a tool display region occupied by the tool folder is an outermost display region in FIG. 15(a). The tool folder has a total of 30 icon identifiers therein, but only 9 icon identifiers are displayed in the display region thereof by using the standard display parameter, and thus, it is necessary to turn to other pages so as to browse other icon identifiers in the tool folder. Other folders that are partly covered in FIG. 15(a) are all displayed according to the standard display parameter.

Figure 15B:
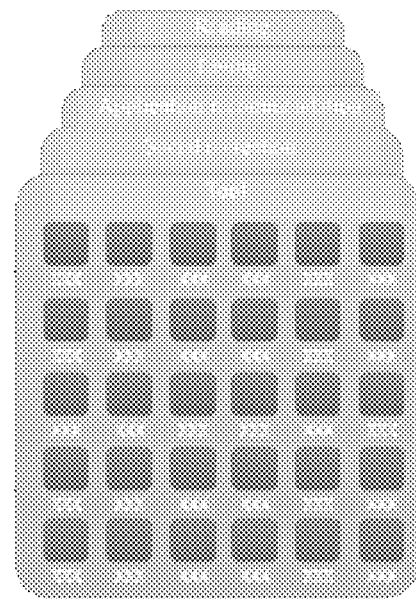
FIG. 15(b) schematically illustrates a second example of folder display under the third display control method.

FIG. 15(b) schematically illustrates a second example of folder display under the third display control method. FIG. 15(b) is a display example when the display switch operation meets the predetermined condition, wherein, the entire display contents in each folder are displayed once and for all. As shown in FIG. 15(b), each of the five folders occupies a corresponding square display region, and a tool display region occupied by the tool folder is an outermost display region in FIG. 15(b). The tool folder has a total of 30 icon identifiers therein, and the entire display contents, i.e., the 30 icon identifiers, are displayed within the display region occupied by the tool folder once and for all in the presentation manner as determined in S220c. Thus, all the icon identifiers in the tool folder can be browsed, without turning to other pages. Other folders that are partly covered in FIG. 15(b) are all displayed within the display regions corresponding thereto in a manner that the entire contents thereof can be displayed once and for all. For example, a social recreation display region occupied by the social recreation folder is partly covered by the tool display region, and the entire display contents thereof (not shown) are displayed in the social recreation display region once and for all. An application recommendation display region occupied by the application recommendation folder is partly covered by the social recreation display region, and the entire display contents thereof (not shown) are displayed in the application recommendation display region once and for all. It is also similar for the living folder and the reading folder. With the slide operation on the display screen, display contents of other folders in the queue are switched on the display screen, and the display contents in other folders are displayed once and for all. Therefore, for any folder in the electronic apparatus, the entire display contents therein can be displayed in the display region occupied by the folder once and for all, so as to collectively display the display contents of the respective folders, and facilitate the user to browse and operate the display contents.

In addition, when the desired icon identifier is found by using the display control method according to the embodiment of the present disclosure, an operation for the icon identifier will be performed, so as to end the display control method. Alternatively, if the desired icon identifier is not found by using the display control method according to the embodiment of the present disclosure, then the process may return to perform steps S220a, S220b and S220c so as to adjust the presentation manner, or may stay in a current presentation manner.

Embodiment Fifteen

Figure 16:
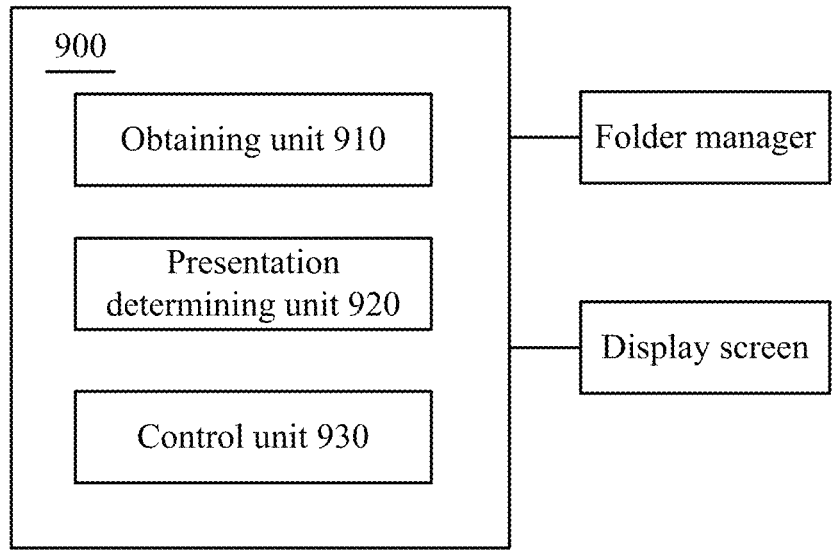
FIG. 16 schematically illustrates a block diagram of a first display control device according to an embodiment of the present disclosure.

FIG. 16 schematically illustrates a block diagram of a first display control device 900 according to an embodiment of the present disclosure. The first display control device 900 is used in an electronic apparatus. The electronic apparatus may comprise a display, in addition to the first display control device 900. As shown in FIG. 16, the first display control device 900 includes an obtaining unit 910, a presentation determining unit 920, and a control unit 930. The first display control device 900 is used for controlling display of a display screen connected thereto.

The obtaining unit 910 is used for obtaining an unfolding instruction. The unfolding instruction is used for instructing the display screen to display a display content of a first folder. The obtaining unit 910, for example, may obtain the unfolding instruction when the first folder is clicked, or generate the unfolding instruction when the user receives a voice instruction of opening the first folder. For example, the obtaining unit 910 may be connected with an input unit such as a keyboard, a touch screen and a microphone, and obtain the unfolding instruction from the input unit. A specific manner for the obtaining unit 910 to obtain the unfolding instruction does not constitute a limitation to the embodiment of the present disclosure. The first folder may be any one of the plurality of folders in the electronic apparatus where the display screen is located, and for example, is any one of the plurality of folders as shown in FIG. 8, which is not limited to a certain folder.

The presentation determining unit 920 determines a presentation manner of the display content of the first folder in response to the unfolding instruction obtained by the obtaining unit 910. The presentation manner enables display of the entire display contents of the first folder within the display region occupied by the first folder once and for all. As an example, in response to the unfolding instruction, the presentation determining unit 920 may determine the presentation manner based on at least one of the number of the icon identifiers in the first folder and an area of the display region occupied by the first folder. In a case where the display region occupied by each folder is fixed, the presentation determining unit 920 may determine the presentation manner only based on the number of the icon identifiers in the first folder. The presentation determining unit 920 may be implemented by using a memory and a processor, and the processor executes a program code stored in the memory to execute respective operations thereof.

Respective presentation manners may be set in advance, and a relationship between the number of the icon identifiers in the first folder and the respective presentation manners is determined. On this basis, the presentation determining unit 920 may determine the presentation manner directly according to the number of the icon identifiers in the first folder.

For example, two display modes for displaying the icon identifiers of the first folder may be set in advance, including a normal display mode and a thumbnail display mode. In the normal display mode, each icon identifier in the first folder is displayed in a default size, and spaces between the respective icon identifiers in the first folder are all default as well. In the thumbnail display mode, as compared with the normal display mode, the respective icon identifiers in the first folder are zoomed out, and the spaces between the respective icon identifiers are also reduced. For example, a few reduced scales may be set corresponding to the number of the icon identifiers in the first folder. The larger the number of the icon identifiers, the greater the reduced scale; and the smaller the number of the icon identifiers, the less the reduced scale.

When the number of the icon identifiers in the first folder is smaller than 9, the presentation determining unit 920 determines the normal display mode as the presentation manner for displaying the display contents of the first folder; when the number of the icon identifiers in the first folder is larger than 9 and smaller than 16, the presentation determining unit 920 determines the thumbnail display mode as the presentation manner for displaying the display contents of the first folder, and sets the reduced scale as $9/16=0.5625$ with respect to the normal display mode; when the number of the icon identifiers in the first folder is larger than 16 and smaller than 25, the presentation determining unit 920 determines the thumbnail display mode as the presentation manner for displaying the display contents of the first folder, and sets the reduced scale as $9/25=0.36$ with respect to the normal display mode, and so on.

As another example of determining the presentation manner, the presentation determining unit 920 may obtain a plurality of icon identifiers in the first folder; determine whether the plurality of icon identifiers can be displayed within the display region occupied by the first folder once and for all according to a standard display parameter; determine the presentation manner of the display content of the first folder as directly displaying the plurality of icon identifiers according to the standard display parameter, when the plurality of icon identifiers can be displayed completely within the display region occupied by the first folder once and for all according to the standard display parameter; determine the presentation manner of the display content of the first folder as displaying the plurality of icon identifiers according to a reduced display parameter, when the plurality of icon identifiers cannot be displayed completely within the display region occupied by the first folder once and for all according to the standard display parameter. A display size of the icon identifier under the reduced display parameter is smaller than a display size under the standard display parameter. The standard display parameter is, for example, a size of each icon identifier, or a maximum display number of the icon identifiers displayed on one display page. The reduced display parameter may be variably set based on the icon identifiers included in the first folder. The above description in conjunction with FIG. 10 can be referred to for specific operations.

The control unit 930 controls to display the display content of the first folder within the display region occupied by the first folder on the display screen, based on the determined presentation manner. The presentation manner determined by the presentation determining unit 920 enables display of the entire display contents of the first folder within the display region occupied by the first folder once and for all, and thus, even if there are a large number of icon identifiers in the first folder, the control unit 930 can display the entire display contents therein once and for all. Thus, the user can browse all the icon identifiers under the first folder, without turning to other pages.

Diagrams of FIG. 11(a) and FIG. 11(b) as well as the descriptions in conjunction with FIG. 11(a) and FIG. 11(b) may be referred to for a specific display effect.

In the technical solution of the first display control device 900 according to the embodiment of the present disclosure, for any folder in the electronic apparatus, the entire display contents therein can be displayed in the display region occupied by the folder once and for all, so as to collectively display the display contents of the respective folders, and facilitate the user to browse and operate the display contents.

In addition, the above-described obtaining unit 910 may further obtain an input operation to generate a call instruction. The call instruction is used for calling the folder manager in the electronic apparatus, as shown in FIG. 16. The folder manager is an application module in the electronic apparatus used for managing respective folders of the electronic apparatus, and the application module may be set in an operating system of the electronic apparatus, and may also be a dedicated application program, which can be implemented by program codes run by a processor. Via the folder manager, the user can perform at least one of operations as follows: deleting an existing folder in the electronic apparatus, adding a folder to the electronic apparatus, controlling a display mode of the existing folder, or modifying a name of the folder. The input operation is, for example, a click operation for a specific folder, or an enable operation for the icon identifier of the folder manager. That is to say, the obtaining unit 910 generates the call instruction for calling the folder manager in response to, for example, the input operation received by the input unit of the electronic apparatus.

The obtaining unit 910 starts the folder manager of the electronic apparatus in response to the call instruction. For example, the obtaining unit 910 transmits a start signal to the folder manager according to the call instruction, to open the folder manager.

The control unit 930 displays all the folders on the electronic apparatus on the display screen in a queue manner via the folder manager. For example, the user may need to browse all the folders in the electronic apparatus to find a desired icon identifier. At this time, the control unit 930 performs control, to display all the folders on the electronic apparatus on the display screen in the queue manner, so that the user can quickly learn an overall situation of the folders in the electronic apparatus, in order to find the desired icon identifier. For example, when the user expects to find the "iReader" icon, he/she may not know a specific folder in which the "iReader" icon is located. The control unit 930 performs a control operation, so that when all the folders on the electronic apparatus are displayed on the display screen in the queue manner, the user may speculate that "iReader" is located in the social recreation folder according to the name of the folder, so as to quickly locate a position thereof. Then, the user clicks on the social recreation folder, the obtaining unit 910 obtains an unfolding instruction, the presentation manner determined by the presentation determining unit 920 enables display of all the icon identifiers in the display region occupied by the social recreation folder once and for all, and thus, the user can quickly find the "iReader" icon without turning to other pages.

In addition, the control unit 930 may further control to make each folder in all the folders in the queue be in the unfolded state, so that the user can browse each folder more quickly. At this time, the control unit 930 may enable each folder to be displayed based on the standard display parameter firstly. Thereafter, for example, when the user clicks on the first folder, the obtaining unit 910 obtains a presentation instruction used for the first folder, and displays the entire display contents of the first folder within the display region occupied by the first folder once and for all.

Under the control of the control unit 930, a diagram of FIG. 13 and relevant description may be referred to for examples that all the folders are displayed on the display screen in the queue manner. In the queue manner, all the folders in the electronic apparatus and their names may be displayed. Thus, the user can speculate a target folder in which the desired icon identifier is located according to the name of the folder, and for example, may quickly view whether the desired icon identifier is in the target folder by clicking on the target folder. A switch operation may be performed under all the folders displayed, until the desired icon identifier is found.

In addition, the obtaining unit 910 may generate an unfolding instruction for each folder in all the folders, while a folder manager of the electronic apparatus is started. This, as shown in FIG. 13, may enable each of all the folders to be in an unfolded state, to facilitate the user to browse and view.

The presentation determining unit 920 can judge whether the user needs to display the display contents under the folder once and for all, and determine the presentation manner of the respective folders only when necessary. As an example, the presentation determining unit 920 may obtain a display switch operation, determine whether the display switch operation meets a predetermined condition, and determine a presentation manner of each folder in all the folders in the queue, when the display switch operation meets the predetermined condition. When the display switch operation does not meet the predetermined condition, the presentation determining unit 920 may determine the presentation manner as displaying the display contents in the respective folders according to the standard display parameter.

The display switch operation obtained by the presentation determining unit 920 is, for example, a click operation by the user on different folders. For example, when the display displays a tool folder, if a social recreation folder is clicked, then the operation of clicking the social recreation folder is a display switch operation. Alternatively, in a case where a display screen is a touch screen, the display switch operation obtained by the presentation determining unit 920 may also be a slide operation on the display. For example, when the user expects to quickly browse the respective folders on the respective electronic apparatuses, he/she may perform slide operations on the touch screen to quickly switch between the respective folders. When sliding speeds of the slide operations are different, display switch speeds between the folders are usually different. The presentation determining unit 920 may be connected with an input unit of the electronic apparatus to obtain the display switch operation.

The predetermined condition is, for example, a slide operation of the display switch operation on the touch screen. When the user's finger slides on the touch screen to perform display switch, the user may need to browse the display content in the folder more quickly, and accordingly it may be necessary to display the entire display contents under the folder once and for all for each folder, so that the presentation determining unit 920 determines the presentation manner thereof for each folder.

Alternatively, the predetermined condition may also be that a sliding speed of the slide operation as the display switch operation is larger than a predetermined speed value. When the user's finger quickly slide on the touch screen to perform display switch, the faster the sliding speed, usually the faster the speed of browsing the respective folders. Accordingly, when the sliding speed of the slide operation is larger than the predetermined speed value, the presentation determining unit 920 can determine a requirement of quickly browsing the display content in the folder, so as determine the presentation manner to enable display of the entire display contents under the folder once and for all for each folder.

After the presentation determining unit 920 determines the presentation manner of each folder, the control unit 930 displays all the folders on the electronic apparatus on the display screen in a queue manner via the folder manager, and controls to display the display content of each folder within the display region occupied by each folder on the display screen based on the determined presentation manner. A diagram of FIG. 15(*a*) and relevant description may be referred to for the display example when the display switch operation does not meet the predetermined condition. A diagram of FIG. 15(*b*) and relevant description may be referred to for the display example when the display switch operation meets the predetermined condition.

In addition, when the desired icon identifier is found by using the first display control device 900 according to the embodiment of the present disclosure, an operation for the icon identifier will be performed, and a control by the first display control device 900 is ended. Alternatively, if the desired icon identifier is not found by using the first display control device 900, the presentation manner may be adjusted via the presentation determining unit 920, or may stay in a current presentation manner.

Embodiment Sixteen

Figure 17:
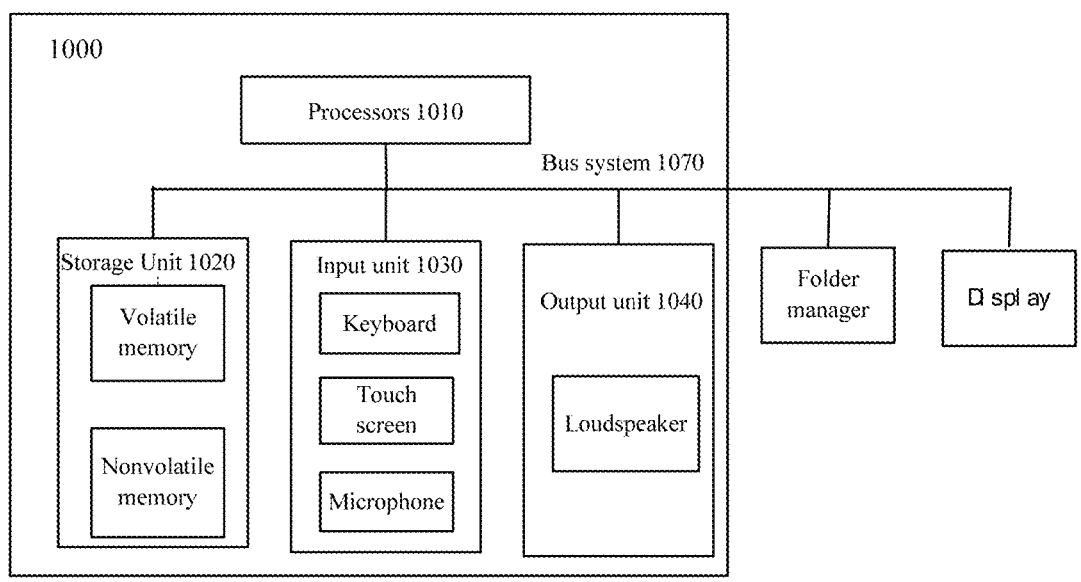
FIG. 17 schematically illustrates a block diagram of a second display control device according to an embodiment of the present disclosure.

FIG. 17 schematically illustrates a block diagram of a second display control device 1000 according to an embodiment of the present disclosure. As shown in FIG. 17, the second display control device 1000 may include one or more processors 1010, a storage unit 1020, an input unit 1030, and an output unit 1040. These components are interconnected through a bus system 1070 and/or a connecting mechanism (not shown) in any other form. The bus system 1070 may be further connected with a display, or a file explorer, and the like.

It should be noted that, the components and the structure of the second display control device 1000 as shown in FIG. 17 are intended to be illustrative rather than limitative, and the second display control device 1000 may also have other components and structures as required, and for example, may not include the input unit 1030, the output unit 1040, etc.

The processor 1010 may be a Central Processing Unit (CPU) or a processing unit with data processing capacity and/or instruction executing capacity in any other form, and may control other components in the second display control device 1000 to execute desired functions.

The storage device 1020 may comprise one or more computer program products, and the computer program product may comprise computer readable storage mediums in various forms, for example, a volatile memory and/or nonvolatile memory. The volatile memory may, for example, comprise a Random Access Memory (RAM) and/or a cache and the like. The nonvolatile memory may, for example, comprise a Read-Only Memory (ROM), a hard disk, a flash disk and so on. One or more computer program instructions may be stored on the computer readable storage mediums, and the processor 1010 may run the program instructions to implement respective steps of respective display control methods according to the embodiments of the present disclosure described in conjunction with FIGS. 9-15. Various application programs or various data, for example, an operating state of the display screen, an operation state of the application program and the like, may be stored in the computer readable storage mediums.

The input unit 1030 may be a unit for inputting an instruction by a user, and may comprise one or more of a keyboard, a mouse, a microphone, a touch panel and the like. The output unit 1040 may output various kinds of information (for example, image or sound) to an exterior (for example, a user), and may comprise a loudspeaker and the like.

In the technical solution of the second display control device 1000 for the application program according to the embodiment of the present disclosure, for any folder in the electronic apparatus, the entire display contents therein can be displayed in the display region occupied by the folder once and for all, so as to collectively display the display contents of the respective folders, and facilitate the user to browse and operate the display contents.

After the respective display control devices according to the embodiments of the present disclosure are described above, an electronic apparatus comprising any one of the first display control device and the second display control device is also within the scope of the present disclosure.

Embodiment Seventeen

For the respective folders and the icons therein as described above, when the user performs assembling and dismissing operations on them, usually many times of operations are needed and a moving distance of a finger is relatively large, which affects user experience.

Figure 18:
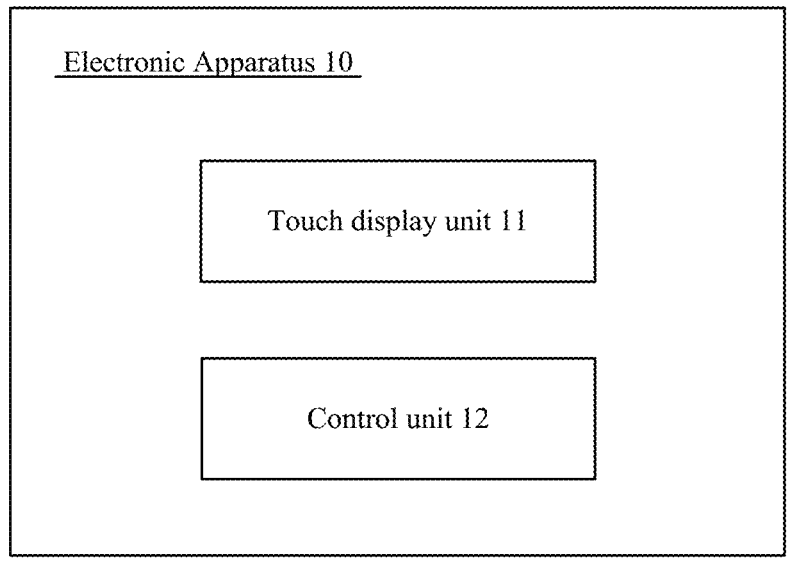
FIG. 18 is a block diagram of overall configuration of an electronic apparatus according to the present disclosure.

Firstly, an electronic apparatus 10 according to the present disclosure is described with reference to FIG. 18. FIG. 18 is a block diagram of overall configuration of an electronic apparatus 10 according to the present disclosure.

The electronic apparatus 10 may be an electronic apparatus, such as a desktop computer, a laptop, a tablet personal computer, a smart phone, a personal digital assistant, or a smart wearable apparatus. Hereinafter, for convenience of description, the smart phone will be described as an example of the electronic apparatus 10.

As shown in FIG. 18, the electronic apparatus 10 comprises a touch display 11 and a control unit 12.

The touch display 11 may be implemented by various types of touch display screens known in the art such as a capacitive touch screen and a resistive touch screen, so that the touch display 11 can respond to a touch operation from the user. Hereinafter, the touch display screen will be described as an example of the touch display 11.

It is worth mentioning that, although the touch display 11 is shown above as a component of the electronic apparatus 10, yet the present disclosure is not limited thereto, the touch display 11 may be further replaced with a display unit such as a Liquid Crystal Display (LCD) and a Light-Emitting Diode (LED) display, and in this case, the user can perform an input operation by a mouse, a track pad and other peripheral apparatuses in order to replace the touch operation as described above. Those skilled in the art can understand the case of the display unit according to a principle of the present disclosure as described below.

The touch display 11 is in a first display state under control of the control unit 12, wherein, in the first display state, the touch display displays a plurality of objects.

The control unit 12 may be a processor such as a Central Processing Unit (CPU), or may be implemented by an embedded controller.

If the touch display 11 receives a first operation for a first object in the plurality of objects, then the control unit 12 controls to generate a first identifier in response to the first operation and switch the touch display 11 from the first display state to a second display state. In the second display state, a plurality of identification regions are displayed in a first region of the touch display 11.

After the touch display 11 is switched to the second display state, if the touch display 11 receives a second operation for the first identifier, then the control unit 12 operates according to a position where the second operation ends. If the position where the second operation ends corresponds to a specific identification region in the plurality of identification regions, then the control unit 12 processes the first object correspondingly according to a second object corresponding to the specific identification region.

The first display state may be a standby state of the electronic apparatus 10. In the standby state, the touch display 11 displays one or more standby pages. In a case where a plurality of standby pages exist, the touch display 11 may initially display a default standby page (or a main interface) among the plurality of standby pages, and the user can slide left and right on the touch display 11 with a finger, so that the touch display 11 is switched between the plurality of standby pages. On each standby page among the one or more standby pages as described above, there may be displayed one or more application program icons and/or one or more folder icons.

It should be noted that, the standby state is neither a black-screen or screen-locked state of the touch display 11 of the electronic apparatus 10, nor a sleep state of the electronic apparatus 10; instead, it is, for example, a state that the display unit 11 displays the main interface after the electronic apparatus 10 is turned on, or a state that the electronic apparatus 10 is made to return to the main interface after the user closes a certain application program which is running.

The first display state may further be a folder page display state. That is to say, in the first display state, the touch display 11 displays a folder page, the user can browse (one or more) application program icons in the folder through the folder page, and operate and set the application program icon, for example, start the application program by clicking on the application program icon, or adjust a position of the application program icon. In addition, in the above-described folder page display state, the touch display 11 may further display a plurality of folder pages, these folder pages may be displayed on the touch display 11, partially overlapping each other, or may be displayed on the touch display 11 in a juxtaposing manner without overlapping each other; and (one or more) application program icons can be displayed in each folder page, and some folder pages may be empty, that is, do not display any application program icon.

The first display state may further be an application program display state; that is to say, in the first display state, the touch display 11 displays a running page of one application program, and the user can use a function provided by the application program through the running page. In this case, the touch display 11 may receive the first operation for the application program from the user, so as to switch the touch display 11 from the application program display state to a second display state (to be illustrated later).

Although the first display state is shown exemplarily above, yet the present disclosure is not limited thereto; those skilled in the art can select the first display state according to the exemplary description above and specific embodiments below, as along as a principle of the present disclosure can be implemented.

The plurality of objects may include one or more icons, the first object is a first icon among the one or more icons, and the first identifier is an icon corresponding to the first icon.

The one or more icons may be the application program icon, the folder icon, or a combination thereof. The application program icon is usually represented by a trademark and/or an image representing a main function of the application program, for example, a camera icon shown in FIG. 19A; and the folder icon is usually represented by a folder name and/or a thumbnail of the folder, for example, an "application recommendation" folder icon shown in FIG. 19C. In this case, the first object is the icon aimed (selected) by the first operation of the user.

It should be noted that, for convenience of description, in the present text, the icon aimed (selected) by the first operation of the user is referred to as the first icon, and thus the first icon referred to herein is not necessarily an icon arranged in a first place in the one or more icons. Accordingly, the first identifier is an icon corresponding to the first icon, which is generated by the control unit 12 in response to the first operation of the user. A purpose of generating the first identifier is to prompt the user after the first operation of the user, so that the user performs a subsequent second operation. Thus, although the first identifier is also an icon, yet the first identifier should be distinguished from the first icon corresponding thereto, so as to achieve the purpose of prompting the user. Hereinafter, the case where the plurality of objects include one or more icons will be further described in combination with a specific embodiment.

The plurality of objects may further include one or more folder pages, the first object is a first folder page among the one or more folder pages, and the first identifier is a folder thumbnail corresponding to the first folder page.

The one or more folder pages may be a preview page of the folder, an unfolded page of the folder, or a combination thereof. As described above, the plurality of folder pages may be displayed on the touch display 11, partially overlapping each other, may be displayed in juxtaposing manner without overlapping each other, or may be displayed in a specific arrangement manner preset by the user. In this case, the first object is the folder page aimed (selected) by the user through the first operation.

It should be noted that, for convenience of description, in the present text, the folder page aimed (selected) by the first operation of the user is referred to as the first folder page, and thus the first folder page referred to herein is not necessarily a folder page arranged in a first place in the one or more folder pages. Accordingly, the first identifier is a folder thumbnail corresponding to the first folder page, which is generated by the control unit 12 in response to the first operation of the user. A purpose of generating the first identifier is to prompt the user after the first operation of the user, so that the user performs a subsequent second operation. Thus, a purpose of prompting the user may be achieved by generating the folder thumbnail of the first folder page. Hereinafter, the case where the plurality of objects include one or more folder pages will be further described in combination with a specific embodiment.

It is worth mentioning that, although the above text shows the case where the plurality of objects respectively include the icons and the folder pages, yet it should be appreciated by those skilled in the art that, the plurality of objects may further include not only one or more icons, but also one or more folder pages. Accordingly, the first object not only may be the first icon as described above, but also may be the first folder page as described above. Hereinafter, this will be further illustrated in conjunction with a specific embodiment.

The first operation may be that the user's finger presses the first object for a time period exceeding a first time threshold. In other words, the first operation is a long-press operation for the first object. The first time threshold is preferably 1 second, and those skilled in the art may further set the first time threshold according to an actual situation. In addition, the first operation is not limited to the long-press operation as described above. For example, if the user wants to select a specific folder page as the first object, then the first operation may be a click operation or a slide operation for a specific region of the specific folder page (e.g., a blank region), the control unit 12 recognizes the click operation or the slide operation as the first operation from the user.

The second display state is a second display state generated through switching from the first display state by the control unit 12 in response to the first operation. In the second display state, a plurality of identification regions are displayed in a first region of a touch display 11.

The first region may be an upper region and a lower region of the touch display 11, an entire display region of the touch display 11, or a specific region preset by the user. In addition, the first region may further be a non-fixed region, for example, the control unit 12 may determine a position of the first region on the touch display 11 according to a difference of a position of the first operation through which the first object is selected. For example, if the position of the first operation is close to a lower edge of the touch display 11, then the first region may be determined to be in a lower half of the touch display 11, to facilitate a subsequent second operation of the user, and shorten a time and an action range of the second operation; similarly, if the position of the first operation is close to a center of the touch display 11, then the first region may be determined to be a circular region with the center of the touch display 11 as an origin and a radius smaller than a predetermined distance threshold.

Figure 19A:
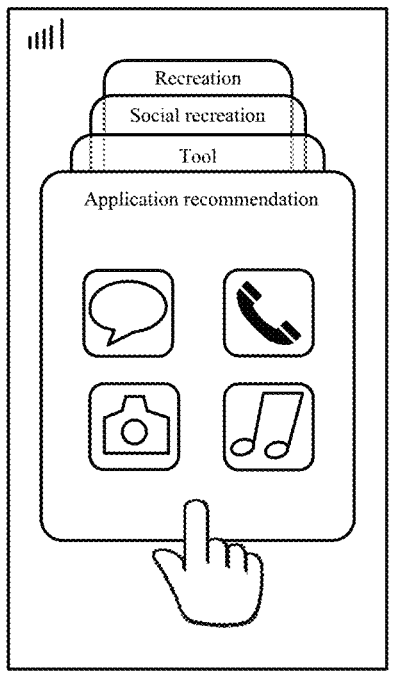
FIGS. 19A to 19C are diagrams illustrating a touch display of an electronic apparatus according to a first embodiment of the present disclosure.

In the first region, there are displayed a plurality of identification regions. The plurality of identification regions are displayed in the first region in a first arrangement manner. The first arrangement manner may be that the plurality of identification regions partially overlap each other or may not overlap each other, or other arrangement manners preset by the user. A shape and arrangement of the plurality of identification regions may be, for example, four folder preview pages as shown in FIG. 19A. The plurality of identification regions play a role in conveniently providing an identifier for the subsequent second operation of the user, so that the user can perform an operation on the generated first identifier. Thus, the plurality of identification regions are set in such a way that the above-described function can be implemented.

In a storage unit (not shown) of the electronic apparatus 10, there may be pre-stored one or more folders; in this case, at least part of the identification regions among the plurality of identification regions may respectively correspond to the plurality of folders. Here, it should be noted that, that the folder being pre-stored in the storage unit as described above is a descriptive statement for convenience of illustration, and the folder actually refers to a memory space having a specific memory address; similar application programs or data or those specified by the user may be stored in these memory spaces, and these memory space can be displayed on the display unit 11 in a visualized form (for example, the identification region, the folder page and the preview page of the folder, and so on according to the present text). In the present text, unless otherwise specified, the term "folder" is intended to include all the folders and information thereof displayed in the visualized form, for example, a folder thumbnail, a folder identification region, a folder page, a folder preview page, and so on. These identification regions have specific identification information, so as to prompt the user, which facilitates the user to perform a subsequent second operation. For example, these identification regions may have identification region names respectively corresponding to or same as the names of the plurality of folders, or may have thumbnails of the folders corresponding thereto.

The plurality of identification regions further include identification regions respectively corresponding to the one or more standby pages as described above. Similar to the above description, the identification regions corresponding to the one or more standby pages may have specific identification information, so as to prompt the user, which facilitates the user to perform a subsequent second operation. The specific identification information is for example, a name or a serial number of the standby page, a thumbnail of the standby page, and soon.

The plurality of identification regions may further include an identification region corresponding to a new folder command. The identification region may have specific identification information, for example, a name and a symbol corresponding to the new folder command, so as to prompt the user, which facilitates the user to perform a subsequent second operation.

Later the plurality of identification regions will be further illustrated in conjunction with a specific embodiment.

The second operation is a subsequent operation of the first operation. With the first operation being the long-press operation as described above as an example, the second operation may be a drag operation performed by the user with a finger on the touch display 11 on the first identifier. In addition, after the first identifier is generated, the control unit 12 may control to maintain the first identifier, so that the user's finger needn't always keep touching the first identifier. In this case, the user can lift the finger off the touch display 11, and afterward, the user may move the first identifier to a desired position through a gesture operation. The electronic apparatus 10 may implement the gesture operation by using known technologies such as an infrared positioning technology, a radio frequency positioning technology, etc., and in order to ensure conciseness of the description, description of the known art is omitted in the present text.

The control unit 12 operates according to a position where the second operation ends. The position where the second operation ends is also a position to which the first identifier moves. With the above-described drag operation (second operation) as an example, when the user completes the drag operation at position A on the touch display 11 and lifts the finger off the touch display 11, the control unit 12 determines position A as the position where the second operation ends.

If the position A corresponds to the specific identification region in the plurality of identification regions as describe above, then the control unit 12 processes the first object accordingly according to a second object corresponding to the specific identification region. Corresponding to the case of the plurality of identification regions as described above, the second object may be one of the one or more folders, may be one of the one or more standby pages, or may be a folder newly created in response to a new folder command. According to different second objects as described above, the control unit 12 may operate differently. For example, if the second object is a folder, then the control unit 12 places the first object (e.g., an application program icon) corresponding to the first identifier in the folder, and the control unit 12 writes the application program corresponding to the first object into a memory address of a storage unit corresponding to the folder. In the above case, if it is a certain application program on a cloud server to which the first object corresponds, then the control unit 12 controls to download the application program from the cloud server and store it into the memory address of the storage unit; and if the first object has already been stored in the storage unit, then the control unit 12 modifies a memory address of the application program corresponding to the first object to the memory address corresponding to the folder.

After the control unit 12 completes the process as described above (i.e., placing the first object in the folder), the control unit 12 may further control to display the folder page of the processed folder on the touch display 11, to facilitate the user to confirm whether the first operation and the second operation performed previously achieve an expected purpose.

The case where the first object is placed in the folder corresponding to the specific identification region is shown above, and those skilled in the art may further implement or understand cases where the application program icon is moved out of the folder (for example, dismissing the folder), one folder is put into another folder, and the application program icon is put into the standby page, and the like, under teaching of the present text.

The electronic apparatus 10 according to the present disclosure generates the first identifier in response to the first operation of the user and generates the plurality of identification regions, and performs a corresponding process on the first object corresponding to the first identifier according to the identification region corresponding to the position where the second operation ends, so as to facilitate the user to move the first object among the plurality of second objects corresponding to the plurality of identification regions, so that the plurality of identification regions can be reasonably set according to different positions of the first operation, which effectively reduces a time and a distance for the second operation of the user.

Hereinafter, the above-described principle according to the present disclosure will be further illustrated in conjunction with a specific embodiment. In order to simplify illustration, description of respective embodiments hereinafter is only exemplary, and repeated parts of the principle according to the present disclosure as described above will be appropriately omitted.

Figure 19B:
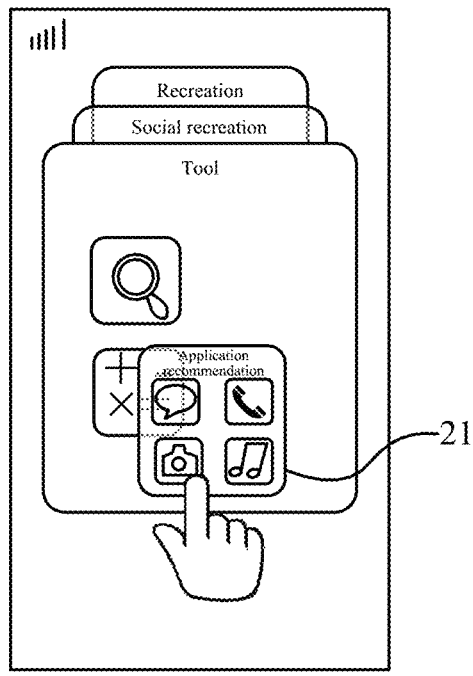
Figure 19C:
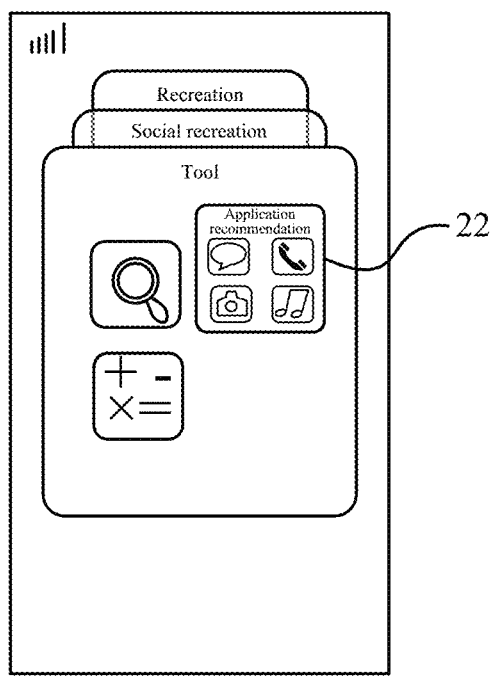

The electronic apparatus 10 according to a first embodiment of the present disclosure will be illustrated firstly with reference to FIGS. 19A to 19C.

FIG. 19A shows a first display state of the electronic apparatus 10. The first display state may be deemed as a page edit state of a smart phone.

As shown in FIG. 19A, in the page edit state, a touch display 11 displays four folder pages, whose names are sequentially (from back to front): recreation, social recreation, tool, and application recommendation. In this embodiment, the above-described four folder pages are just deemed as a plurality of objects displayed by the touch display 11. Correspondingly, a storage unit of the electronic apparatus 10 may have four folders respectively corresponding to the above-described four folder pages stored therein.

As shown in FIG. 19A, the user performs a long press on an "application recommendation" folder page (for example, for more than 1 second) with a finger, the control unit 12 generates a folder thumbnail 21 (as shown in FIG. 19B) of the "application recommendation" folder page in response to the long-press operation. In this procedure, the "application recommendation" folder page disappears from the touch display 11, or the procedure may be deemed as a procedure that the "application recommendation" folder page is quickly and gradually zoomed out to the folder thumbnail 21 as shown in FIG. 19B.

Next, as shown in FIG. 19B, the touch display 11 displays: a "recreation" folder page, a "social recreation" folder page and a "tool" folder page (from back to front) in a middle region thereof, and the three folder pages are just three identification regions displayed in the second display state. In fact, in this embodiment, the three folder pages may be deemed to be maintained substantially unchanged based on a position as shown in FIG. 19A.

Next, the user's finger keeps pressing on the folder thumbnail 21, and gradually moves (drags) the finger to a position shown by the "application recommendation" folder icon 22 in FIG. 19C. In this procedure, the folder thumbnail 21 moves along with the user's finger, and ultimately reaches the position shown by the "application recommendation" folder icon 22 in FIG. 19C.

Next, the user's finger is lifted off the touch display 11 in the position shown by the "application recommendation" folder icon 22 in FIG. 19C, and the folder thumbnail 21 is placed in the "tool" folder page. As shown in FIG. 19C, after the folder thumbnail 21 is placed in the "tool" folder page, the control unit 12 controls to generate the "application recommendation" folder icon 22 in the position of the folder thumbnail 21 (i.e., the position where the finger is lifted), and the folder icon is slightly smaller than the folder thumbnail 21, so as to prompt the user that the "application recommendation" folder has been put into the "tool" folder through the above-described long-press operation and a finger move operation. Correspondingly, a memory address of the "application recommendation" folder (including the respective application programs therein) in the storage unit is modified to a memory address corresponding to the "tool" folder. It is worth noting that, although the above text describes that the "application recommendation" folder icon 22 is generated in the position where the finger is lifted, yet those skilled in the art should understand that, since there is usually a certain distance between the respective icons, a certain distance error is allowed in the position where the user's finger is lifted. That is, whenever the finger is lifted, most region of the folder thumbnail 21 has been located in a distance error range of the "application recommendation" folder icon 22 to be generated, and the control unit 12 can judge and generate the "application recommendation" folder icon 22.

In addition, although FIG. 19C illustrates the case where the user moves the folder thumbnail 21 to the "tool" folder page through the finger drag operation, yet those skilled should understand that, the user may, based on the case as shown in FIG. 19B, further move the folder thumbnail 21 to the "social recreation" folder page or the "recreation" folder page, and then lift the finger, so as to place the folder thumbnail 21 in the "social recreation" folder page or the "recreation" folder page.

Embodiment Eighteen

Hereinafter, an electronic apparatus 10 according to a second embodiment of the present disclosure is described with reference to FIGS. 20A to 20C.

Figure 20A:
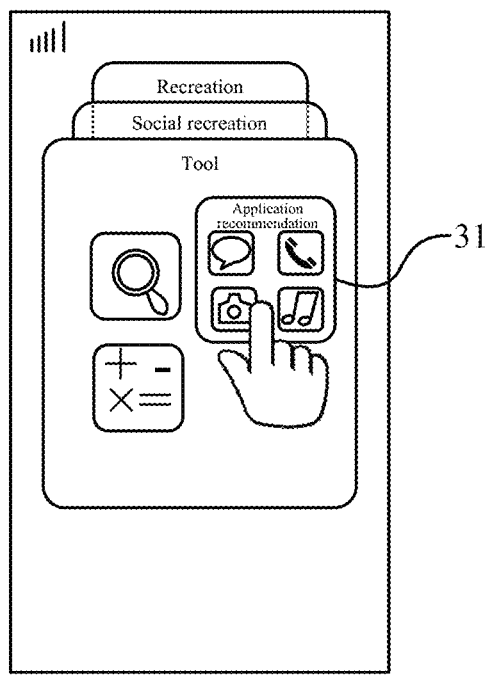
FIGS. 20A to 20C are diagrams illustrating a touch display of an electronic apparatus according to a second embodiment of the present disclosure.
Figure 20B:
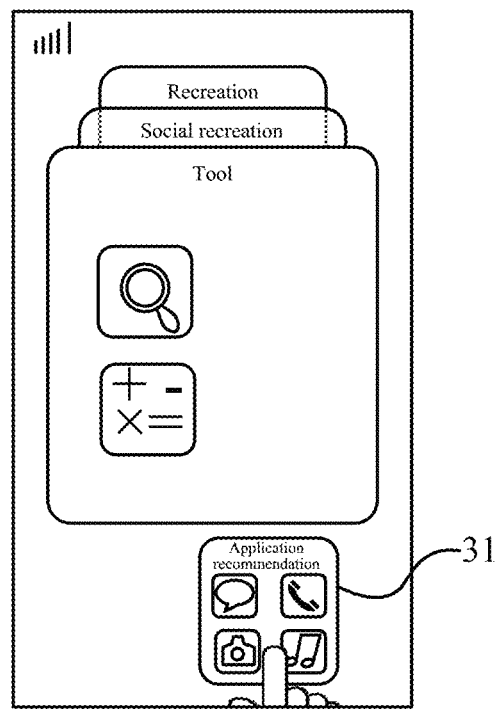
Figure 20C:
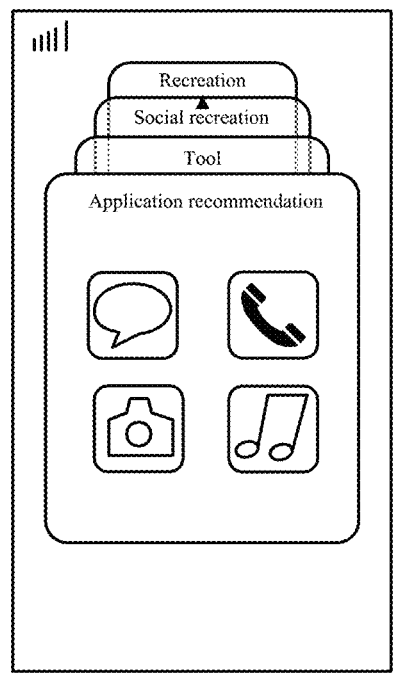

FIGS. 20A to 20C illustrates a procedure that an "application recommendation" folder icon 22 in FIG. 19C is moved out of a "tool" folder page so as to regenerate an "application recommendation" folder page. Thus, to some extent, operations of FIGS. 20A to 20C can be deemed as reverse operations of FIGS. 19A to 19C. Hereinafter, the procedure of FIGS. 20A to 20C is illustrated in detail.

FIG. 20A shows a first display state of the electronic apparatus 10. The first display state may be deemed as a page edit state of a smart phone.

As shown in FIG. 20A, in the page edit state, a touch display 11 displays three folder pages, whose names are sequentially (from back to front): recreation, social recreation, and tool. In this embodiment, the above-described three folder pages are just deemed as a plurality of objects displayed by the touch display 11. Correspondingly, a storage unit of the electronic apparatus 10 may have three folders respectively corresponding to the above-described three folder pages stored therein.

As shown in FIG. 20A, the user performs a long press on an "application recommendation" folder icon (for example, for more than 1 second) with a finger, the control unit 12 generates an enlarged icon 31 (as shown in FIG. 20A) corresponding to the "application recommendation" folder icon in response to the long-press operation, to replace the "application recommendation" folder icon in an original position.

Next, as shown in FIG. 20A, the touch display 11 displays: a "recreation" folder page, a "social recreation" folder page and a "tool" folder page, as well as a blank region except the three folder pages, and the above-described three folder pages and the blank region are four identification regions. The blank region is an identification region corresponding to a new folder command. In fact, in this embodiment, the above-described three folder pages may be deemed to be maintained substantially unchanged based on a position as shown in FIG. 20A, and the blank region may also be replaced with a rectangular frame region (not shown) disposed close to a lower edge of the touch display 11.

Next, the user's finger keeps pressing on the icon 31, and gradually moves (drags) the finger to a position as shown in FIG. 20B, i.e. the blank region as described above. In this procedure, the icon 31 moves along with the user's finger, and ultimately reaches the position as shown in FIG. 20B.

Next, the user's finger is lifted off the touch display 11 in the position as shown in FIG. 20B, and the control unit 12 judges that a position where the finger is lifted corresponds to the blank region (i.e., the identification region corresponding to the new folder command), and then as shown in FIG. 20C, generates an "application recommendation" folder page corresponding to the "application recommendation" folder icon, and displays the application program in the "application recommendation" folder corresponding to the "application recommendation" folder icon on the newly generated "application recommendation" folder page in a form of application program icon. Correspondingly, a memory address of the "application recommendation" folder (including the respective application programs therein) in a storage unit is modified to a new memory address, i.e. a memory address different from a memory address of the "tool" folder.

Embodiment Nineteen

Hereinafter, an electronic apparatus 10 according to a third embodiment of the present disclosure is described with reference to FIG. 21A to FIG. 21D.

Figure 21A:
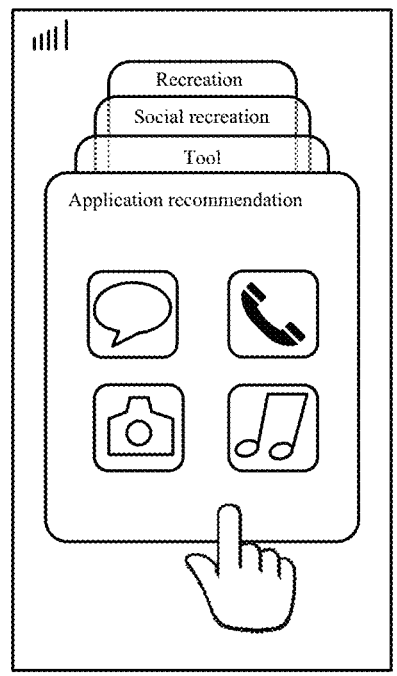
FIGS. 21A to 21D are diagrams illustrating a touch display of an electronic apparatus according to a third embodiment of the present disclosure.

FIG. 21A shows a first display state of the electronic apparatus 10. The first display state may be deemed as a page edit state of a smart phone. Although the first display state as shown in FIG. 21A is deemed as the page edit state, yet those skilled in the art should understand that, the case as shown in FIG. 21A may further be a standby page display state of the electronic apparatus 10. That is, the electronic apparatus 10 has a total of four standby pages: "recreation", "social recreation", "tool" and "application recommendation", and the user may switch among the four standby pages by sliding a finger.

As shown in FIG. 21A, in the page edit state, a touch display 11 displays four folder pages, whose names are sequentially (from back to front): recreation, social recreation, tool, and application recommendation. In this embodiment, the above-described four folder pages are just deemed as a plurality of objects displayed by the touch display 11. Correspondingly, a storage unit of the electronic apparatus 10 may have four folders respectively corresponding to the above-described four folder pages stored therein.

Figure 21B:
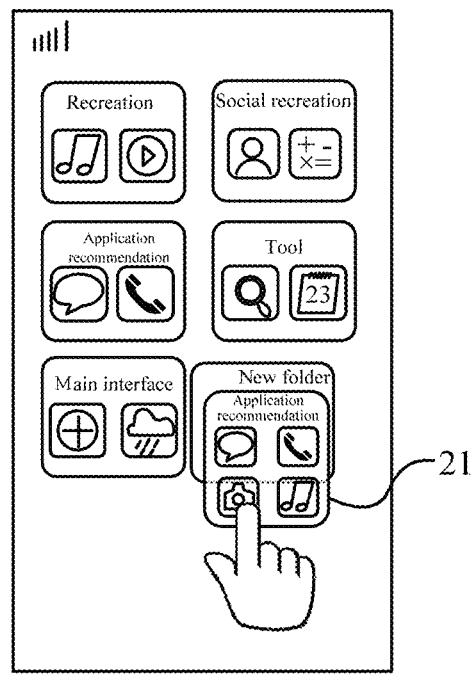

As shown in FIG. 21A, the user performs a long press on an "application recommendation" folder page (for example, for more than 1 second) with the finger, the control unit 12 generates a folder thumbnail 21 (as shown in FIG. 21B) of the "application recommendation" folder page in response to the long-press operation. In this procedure, the "application recommendation" folder page disappears from the touch display 11, or the procedure may be deemed as a procedure that the "application recommendation" folder page is quickly and gradually zoomed out to the folder thumbnail 21 as shown in FIG. 21B.

Next, as shown in FIG. 21B, the touch display 11 displays identification regions in a juxtaposing (not overlapping each other) manner as follows: a "recreation" folder identification region, a "social recreation" folder identification region, a "tool" folder identification region, an "application recommendation" folder identification region, a main interface identification region and a new folder identification region. The above-described respective identification regions are a plurality of identification regions displayed in a second display state. Correspondingly, a "recreation" folder, a "social recreation" folder, a "tool" folder, an "application recommendation folder, a default standby page and a new folder respectively corresponding to the above-described identification regions are the second objects of this embodiment. As described above, the main interface identification region corresponds to a default standby page of the electronic apparatus 10. The new folder identification region is an identification region corresponding to the new folder command.

Figure 21C:
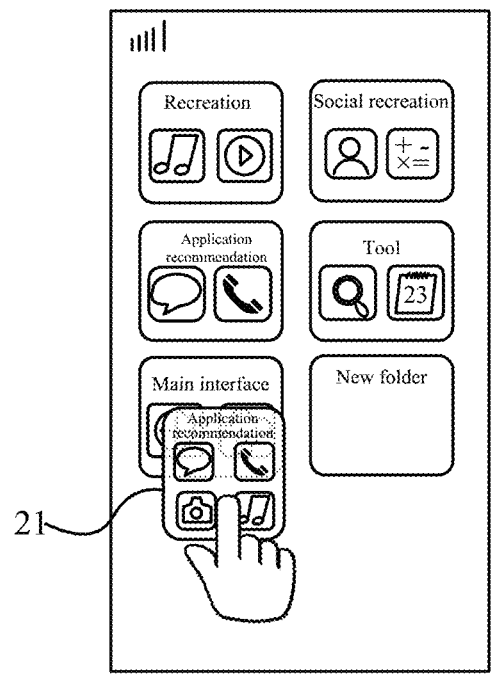

Next, the user's finger keeps pressing on the folder thumbnail 21, and gradually moves (drags) the finger to a position as shown in FIG. 21C, that is, the main interface identification region. In this procedure, the folder thumbnail 21 moves along with the user's finger, and ultimately reaches the position as shown in FIG. 21C.

Figure 21D:
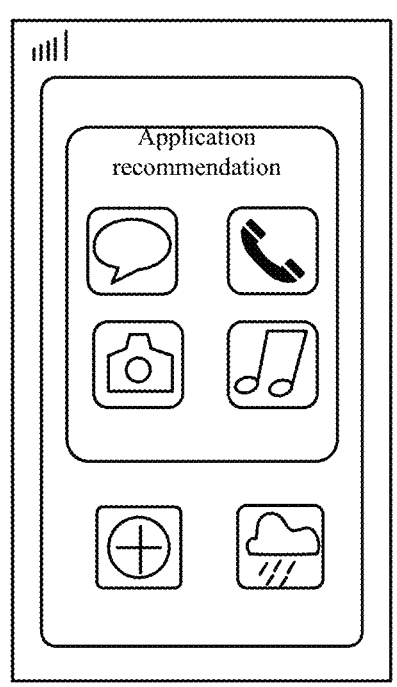

Next, the user's finger is lifted off the touch display 11 in the position as shown in FIG. 21C, and the folder thumbnail 21 is placed in the main interface identification region. As shown in FIG. 21D, after the folder thumbnail 21 is placed in the main interface identification region, the control unit 12 controls to display the default standby page of the electronic apparatus 10 corresponding to the main interface identification region, and controls to generate the "application recommendation" folder page on the default standby page. On the "application recommendation" folder page, there may be displayed icons of respective application programs as included in the "application recommendation" folder. Correspondingly, a memory address of the "application recommendation" folder (including the respective application programs therein) in a storage unit is modified to a memory address of the default standby page.

In addition, although FIG. 21D illustrates the case where the user moves the folder thumbnail 21 to the main interface identification region through the finger drag operation, those skilled should understand that, the user may, based on the case as shown in FIG. 21B, further move the folder thumbnail 21 to several other identification regions.

In addition, although FIG. 21D shows the case where the "application recommendation" folder page is displayed on the default standby page, yet the present disclosure is not limited thereto. After the folder thumbnail 21 is placed in the main interface identification region, the control unit 12 may further control to display the "application recommendation" folder icon in the default standby page, that is, the "application recommendation" folder is not unfolded in the default standby page.

Embodiment Twenty

Hereinafter, a display control method according to the present disclosure will be described with reference to FIG. 22. The display control method shown in FIG. 22 may be applied to the electronic apparatus 10 shown in FIG. 18. Here, the display control method will be described in conjunction with the electronic apparatus 10 shown in FIG. 18. In order that the specification is more concise, detailed description of respective components in the electronic apparatus 10 will be omitted.

Figure 22:
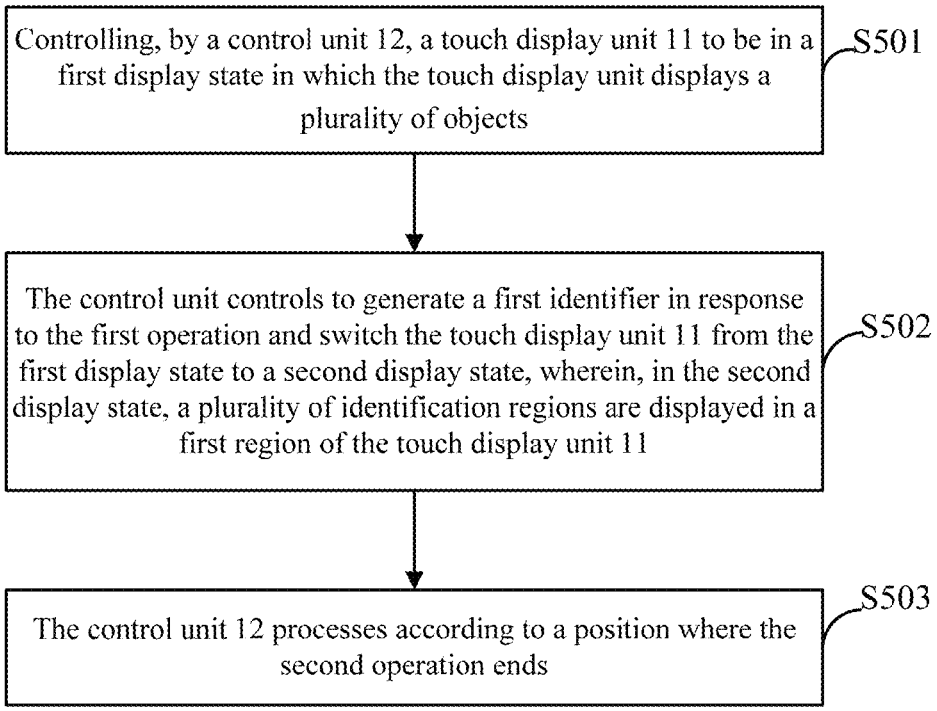
FIG. 22 is a flow chart illustrating a display control method according to the present disclosure.

As shown in FIG. 22, in step S501, a control unit 12 controls a touch display 11 to be in a first display state. In the first display state, the touch display displays a plurality of objects.

Specifically, the first display state may be a standby state of the electronic apparatus 10. In the standby state, the touch display 11 displays one or more standby pages. In a case where there are a plurality of standby pages, the touch display 11 may initially display a default standby page (or a main interface) among the plurality of standby pages, and the user can slide left and right on the touch display 11 with a finger, so that the touch display 11 is switches among the plurality of standby pages. On each standby page among the one or more standby pages as described above, there may be displayed one or more application program icons and/or one or more folder icons.

It should be noted that, the standby state is neither a black-screen or screen-locked state of the touch display 11 of the electronic apparatus 10, nor a sleep state of the electronic apparatus 10; instead, it is, for example, a state that the display unit 11 displays the main interface after the electronic apparatus 10 is turned on, or a state that the electronic apparatus 10 is made to return to the main interface after the user closes a certain application program which is running.

The first display state may further be a folder page display state. That is to say, in the first display state, the touch display 11 displays a folder page, the user can browse (one or more) application program icons in the folder through the folder page, and operate and set the application program icon, for example, start the application program by clicking on the application program icon, or adjust a position of the application program icon. In addition, in the above-described folder page display state, the touch display 11 may further display a plurality of folder pages, these folder pages may be displayed on the touch display 11, partially overlapping each other, or may be displayed on the touch display 11 in a juxtaposing manner without overlapping each other; and (one or more) application program icons can be displayed in each folder page, and some folder pages may be empty, i.e. no application program icon is displayed.

The first display state may further be an application program display state. That is to say, in the first display state, the touch display 11 displays a running page of one application program, and the user can use a function provided by the application program through the running page. In this case, the touch display 11 may receive the first operation for the application program from the user, so as to switch the touch display 11 from the application program display state to a second display state (to be illustrated later).

Although the first display state is shown exemplarily above, yet the present disclosure is not limited thereto. Those skilled in the art can select the first display state according to the exemplary description above and specific embodiments below, as along as a principle of the present disclosure can be implemented.

The plurality of objects may include one or more icons, the first object is a first icon among the one or more icons, and the first identifier is an icon corresponding to the first icon.

The one or more icons may be the application program icon, the folder icon, or a combination thereof. The application program icon is usually represented by a trademark and/or an image representing a main function of the application program, for example, a camera icon shown in FIG. 19A; and the folder icon is usually represented by a folder name and/or a thumbnail of the folder, for example, an "application recommendation" folder icon shown in FIG. 19C. In this case, the first object is the icon aimed (selected) by the first operation of the user.

It should be noted that, for convenience of description, in the present text, the icon aimed (selected) by the first operation of the user is referred to as the first icon, and thus the first icon referred to herein is not necessarily an icon arranged in the first place in the one or more icons. Accordingly, the first identifier is an icon corresponding to the first icon, which is generated by the control unit 12 in response to the first operation of the user. A purpose of generating the first identifier is to prompt the user after the first operation of the user, so that the user performs a subsequent second operation. Thus, although the first identifier is also an icon, yet the first identifier should be distinguished from the first icon corresponding thereto, so as to achieve the purpose of prompting the user. Hereinafter, the case where the plurality of objects include one or more icons will be further described in combination with a specific embodiment.

The plurality of objects may further include one or more folder pages, the first object is a first folder page among the one or more folder pages, and the first identifier is a folder thumbnail corresponding to the first folder page.

The one or more folder pages may be a preview page of the folder, an unfolded page of the folder, or a combination thereof. As described above, the plurality of folder pages may be displayed on the touch display 11, partially overlapping each other, may be displayed in a juxtaposing manner without overlapping each other, or may be displayed in a specific arrangement manner preset by the user. In this case, the first object is the folder page aimed (selected) by the user through the first operation.

It should be noted that, for convenience of description, in the present text, the folder page aimed (selected) by the first operation of the user is referred to as the first folder page, and thus the first folder page referred to herein is not necessarily a folder page arranged in a first place in the one or more folder pages. Accordingly, the first identifier is a folder thumbnail corresponding to the first folder page, which is generated by the control unit 12 in response to the first operation of the user. A purpose of generating the first identifier is to prompt the user after the first operation of the user, so that the user performs a subsequent second operation. Thus, a purpose of prompting the user may be achieved by generating the folder thumbnail of the first folder page. Hereinafter, the case where the plurality of objects include one or more folder pages will be further described in combination with a specific embodiment.

It is worth mentioning that, although the above text shows the case where the plurality of objects respectively include the icons and the folder pages, it should be appreciated by those skilled in the art that, the plurality of objects may further include not only one or more icons, but also one or more folder pages. Accordingly, the first object not only may be the first icon as described above, but also may be the first folder page as described above.

Next, if the touch display 11 receives a first operation for the first object in the plurality of objects, the process proceeds to step S502. In step S502, the control unit 12 controls to generate a first identifier in response to the first operation and switches the touch display 11 from the first display state to a second display state. In the second display state, a plurality of identification regions are displayed in a first region of the touch display 11.

Specifically, the first operation may be that the user's finger presses the first object for a time period exceeding a first time threshold. In other words, the first operation is a long-press operation for the first object. The first time threshold is preferably 1 second, and those skilled in the art may further set the first time threshold according to an actual situation. In addition, the first operation is not limited to the long-press operation as described above. For example, if the user wants to select a specific folder page as the first object, then the first operation may be a click operation or a slide operation for a specific region of the specific folder page (e.g., a blank region), the control unit 12 recognizes the click operation or the slide operation as the first operation from the user.

The second display state is a second display state generated through switching from the first display state by the control unit 12 in response to the first operation. In the second display state, a plurality of identification regions are displayed in a first region of a touch display 11.

The first region may be an upper region and a lower region of the touch display 11, an entire display region of the touch display 11, or a specific region preset by the user. In addition, the first region may further be a non-fixed region, for example, the control unit 12 may determine a position of the first region on the touch display 11 according to a difference of a position of the first operation through which the first object is selected. For example, if the position of the first operation is close to a lower edge of the touch display 11, then the first region may be determined to be in a lower half of the touch display 11, to facilitate a subsequent second operation of the user, and shorten a time and an action range of the second operation; similarly, if the position of the first operation is close to a center of the touch display 11, then the first region may be determined to be a circular region with the center of the touch display 11 as an origin and a radius smaller than a predetermined distance threshold.

In the first region, there are displayed a plurality of identification regions. The plurality of identification regions are displayed in the first region in a first arrangement manner. The first arrangement manner may be that the plurality of identification regions partially overlap each other or may not overlap each other, or other arrangement manners preset by the user. A shape and arrangement of the plurality of identification regions may be, for example, four folder preview pages as shown in FIG. 19A. The plurality of identification regions play a role in conveniently providing an identifier for the subsequent second operation of the user, so that the user can perform an operation on the generated first identifier. Thus, the plurality of identification regions are set in such a way that the above-described function can be implemented.

In a storage unit (not shown) of the electronic apparatus 10, there may be pre-stored one or more folders; in this case, at least part of the identification regions among the plurality of identification regions may respectively correspond to the plurality of folders. Here, it should be noted that, that the folder is pre-stored in the storage unit as described above is a descriptive statement for convenience of illustration, and the folder actually refers to a memory space having a specific memory address; similar application programs or data or those specified by the user may be stored in these memory spaces, and these memory space can be displayed on the display unit 11 in a visualized form (for example, the identification region, the folder page and the preview page of the folder, and so on according to the present text). In the present text, unless otherwise specified, the term "folder" is intended to include all the folders and information thereof displayed in the visualized form, for example, a folder thumbnail, a folder identification region, a folder page, a folder preview page, and so on. These identification regions have specific identification information, so as to prompt the user, which facilitates the user to perform a subsequent second operation. For example, these identification regions may have identification region names respectively corresponding to or same as the names of the plurality of folders, or may have thumbnails of the folders corresponding thereto.

The plurality of identification regions further include identification regions respectively corresponding to the one or more standby pages as described above. Similar to the above description, the identification regions corresponding to the one or more standby pages may have specific identification information, so as to prompt the user, which facilitates the user to perform a subsequent second operation. The specific identification information is for example, a name or a serial number of the standby page, a thumbnail of the standby page, and soon.

The plurality of identification regions may further include an identification region corresponding to a new folder command. The identification region may have specific identification information, for example, a name and a symbol corresponding to the new folder command, so as to prompt the user, which facilitates the user to perform a subsequent second operation.

Next, after the touch display 11 is switched to the second display state, if the touch display 11 receives the second operation for the first object, the process proceeds to step S503. In step S503, the control unit 12 operates according to a position where the second operation ends.

Specifically, the second operation is a subsequent operation of the first operation. With the first operation being the long-press operation as described above as an example, the second operation may be a drag operation performed by the user with a finger on the touch display 11 on the first identifier. In addition, after the first identifier is generated, the control unit 12 may control to maintain the first identifier, so that the user's finger needn't always keep touching the first identifier; in this case, the user can lift the finger off the touch display 11, and afterward, the user may move the first identifier to a desired position through a gesture operation. The electronic apparatus 10 may implement the gesture operation by using known technologies such as an infrared positioning technology, a radio frequency positioning technology, etc., and in order to ensure conciseness of the description, description of the known art is omitted in the present text.

The control unit 12 operates according to a position where the second operation ends. The position where the second operation ends is also a position to which the first identifier moves. With the above-described drag operation (second operation) as an example, when the user completes the drag operation at position A on the touch display 11 and lifts the finger off the touch display 11, the control unit 12 determines position A as the position where the second operation ends.

If the position where the second operation ends corresponds to the specific identification region in the plurality of identification regions, then the control unit 12 processes the first object correspondingly according to a second object corresponding to the specific identification region.

Specifically, corresponding to the case of the plurality of identification regions as described above, the second object may be one of the one or more folders, may be one of the one or more standby pages, or may be a folder newly created in response to a new folder command. According to different second objects as described above, the control unit 12 may operate differently. For example, if the second object is a folder, then the control unit 12 places the first object (e.g., an application program icon) corresponding to the first identifier into the folder, and the control unit 12 writes the application program corresponding to the first object into a memory address of a storage unit corresponding to the folder. In the above case, if it is a certain application program on a cloud server to which the first object corresponds, then the control unit 12 controls to download the application program from the cloud server and store it into the memory address of the storage unit; and if the first object has already been stored in the storage unit, then the control unit 12 modifies a memory address of the application program corresponding to the first object to the memory address corresponding to the folder.

After the control unit 12 completes the process as described above (i.e., placing the first object into the folder), the control unit 12 may further control to display the folder page of the processed folder on the touch display 11, to facilitate the user to confirm whether the first operation and the second operation performed previously achieve an expected purpose.

The case where the first object is placed in the folder corresponding to the specific identification region is shown above, and those skilled in the art may further implement or understand cases where the application program icon is moved out of the folder (for example, dismissing the folder), one folder is put into another folder, and the application program icon is put into the standby page, and the like, under teaching of the present text.

In the control method according to the present disclosure, the first identifier is generated in response to the first operation and the plurality of identification regions are generated, and a corresponding process is performed on the first object corresponding to the first identifier according to the identification region corresponding to the position where the second operation ends, so as to facilitate the user to move the first object among the plurality of second objects corresponding to the plurality of identification regions, so that the plurality of identification regions be reasonably set according to different positions of the first operation, which effectively reduces a time and a distance for the second operation of the user.

Hereinafter, the above-described control method according to the present disclosure will be further described in conjunction with FIGS. 19A to 19C, FIGS. 20A to 20C and FIG. 21A to FIG. 21D. In order to simplify illustration, description of respective embodiments hereinafter is only exemplary, and repeated parts of the principle according to the present disclosure as described above will be appropriately omitted.

The display control method according the present disclosure will be illustrated firstly with reference to FIGS. 19A to 19C.

FIG. 19A shows a first display state of the electronic apparatus 10. The first display state may be deemed as a page edit state of a smart phone.

As shown in FIG. 19A, in the page edit state, a touch display 11 displays four folder pages, whose names are sequentially (from back to front): recreation, social recreation, tool and application recommendation. In this embodiment, the above-described four folder pages are just deemed as a plurality of objects displayed by the touch display 11. Correspondingly, a storage unit of the electronic apparatus 10 may have four folders respectively corresponding to the above-described four folder pages stored therein.

As shown in FIG. 19A, the user performs a long press on an "application recommendation" folder page (for example, for more than 1 second) with a finger, the control unit 12 generates a folder thumbnail 21 (as shown in FIG. 19B) of the "application recommendation" folder page in response to the long-press operation. In this procedure, the "application recommendation" folder page disappears from the touch display 11, or the procedure may be deemed as a procedure that the "application recommendation" folder page is quickly and gradually zoomed out to the folder thumbnail 21 as shown in FIG. 19B.

Next, as shown in FIG. 19B, the touch display 11 displays: a "recreation" folder page, a "social recreation" folder page and a "tool" folder page (from back to front) in a middle region thereof, and the three folder pages are just three identification regions displayed in the second display state. In fact, in this embodiment, the three folder pages may be deemed to be maintained substantially unchanged based on a position as shown in FIG. 19A.

Next, the user's finger keeps pressing on the folder thumbnail 21, and gradually moves (drags) the finger to a position shown by the "application recommendation" folder icon 22 in FIG. 19C. In this procedure, the folder thumbnail 21 moves along with the user's finger, and ultimately reaches the position shown by the "application recommendation" folder icon 22 in FIG. 19C.

Next, the user's finger is lifted off the touch display 11 in the position shown by the "application recommendation" folder icon 22 in FIG. 19C, and the folder thumbnail 21 is placed in the "tool" folder page. As shown in FIG. 19C, after the folder thumbnail 21 is placed in the "tool" folder page, the control unit 12 controls to generate the "application recommendation" folder icon 22 in the position of the folder thumbnail 21 (i.e., the position where the finger is lifted), and the folder icon is slightly smaller than the folder thumbnail 21, so as to prompt the user that the "application recommendation" folder has been put into the "tool" folder through the above-described long-press operation and a finger move operation. Correspondingly, a memory address of the "application recommendation" folder (including the respective application programs therein) in the storage unit is modified to a memory address corresponding to the "tool" folder. It is worth noting that, although the above text describes that the "application recommendation" folder icon 22 is generated in the position where the finger is lifted, those skilled in the art should understand that, since there is usually a certain distance between the respective icons, a certain distance error is allowed in the position where the user's finger is lifted. That is, whenever the finger is lifted, most region of the folder thumbnail 21 has been located in a distance error range of the "application recommendation" folder icon 22 to be generated, and the control unit 12 can judge and generate the "application recommendation" folder icon 22.

In addition, although FIG. 19C illustrates the case where the user moves the folder thumbnail 21 to the "tool" folder page through the finger drag operation, yet those skilled should understand that, the user may, based on the case as shown in FIG. 19B, further move the folder thumbnail 21 to the "social recreation" folder page or the "recreation" folder page, and then lift the finger, so as to place the folder thumbnail 21 in the "social recreation" folder page or the "recreation" folder page.

Hereinafter, the display control method according to the present disclosure is described with reference to FIGS. 20A to 20C.

FIGS. 20A to 20C illustrates a procedure that an "application recommendation" folder icon 22 in FIG. 19C is moved out of a "tool" folder page, so as to regenerate an "application recommendation" folder page. Thus, to some extent, operations of FIGS. 20A to 20C can be deemed as reverse operations of FIGS. 19A to 19C. Hereinafter, the procedure of FIGS. 20A to 20C is illustrated in detail.

FIG. 20A shows a first display state of the electronic apparatus 10. The first display state may be deemed as a page edit state of a smart phone.

As shown in FIG. 20A, in the page edit state, a touch display 11 displays three folder pages, whose names are sequentially (from back to front): recreation, social recreation and tool. In this embodiment, the above-described three folder pages are just deemed as a plurality of objects displayed by the touch display 11. Correspondingly, a storage unit of the electronic apparatus 10 may have three folders respectively corresponding to the above-described three folder pages stored therein.

As shown in FIG. 20A, the user performs a long press on an "application recommendation" folder icon (for example, for more than 1 second) with a finger, the control unit 12 generates an enlarged icon 31 (as shown in FIG. 20A) corresponding to the "application recommendation" folder icon in response to the long-press operation, to replace the "application recommendation" folder icon in an original position.

Next, as shown in FIG. 20A, the touch display 11 displays: a "recreation" folder page, a "social recreation" folder page and a "tool" folder page, as well as a blank region except the three folder pages, and the above-described three folder pages and the blank region are four identification regions. The blank region is an identification region corresponding to a new folder command. In fact, in this embodiment, the above-described three folder pages may be deemed to be maintained substantially unchanged based on a position as shown in FIG. 20A, and the blank region may also be replaced with a rectangular frame region (not shown) disposed close to a lower edge of the touch display 11.

Next, the user's finger keeps pressing on the icon 31, and gradually moves (drags) the finger to a position as shown in FIG. 20B, i.e. the blank region as described above. In this procedure, the icon 31 moves along with the user's finger, and ultimately reaches the position as shown in FIG. 20B.

Next, the user's finger is lifted off the touch display 11 in the position as shown in FIG. 20B, and the control unit 12 judges that a position where the finger is lifted corresponds to the blank region (i.e., the identification region corresponding to the new folder command), and then as shown in FIG. 20C, generates an "application recommendation" folder page corresponding to the "application recommendation" folder icon, and displays the application program in the "application recommendation" folder corresponding to the "application recommendation" folder icon on the newly generated "application recommendation" folder page in a form of application program icon. Correspondingly, a memory address of the "application recommendation" folder (including the respective application programs therein) in a storage unit is modified to a new memory address, i.e. a memory address different from a memory address of the "tool" folder.

Hereinafter, the display control method according the present disclosure is described with reference to FIG. 21A to FIG. 21D.

FIG. 21A shows a first display state of the electronic apparatus 10. The first display state may be deemed as a page edit state of a smart phone. Although the first display state as shown in FIG. 21A is deemed as the page edit state, those skilled in the art should understand that, the case as shown in FIG. 21A may further be a standby page display state of the electronic apparatus 10. That is, the electronic apparatus 10 has a total of four standby pages: "recreation", "social recreation", "tool" and "application recommendation", and the user may switch among the four standby pages by sliding a finger.

As shown in FIG. 21A, in the page edit state, a touch display 11 displays four folder pages, whose names are sequentially (from back to front): recreation, social recreation, tool and application recommendation. In this embodiment, the above-described four folder pages are just deemed as a plurality of objects displayed by the touch display 11. Correspondingly, a storage unit of the electronic apparatus 10 may have four folders respectively corresponding to the above-described four folder pages stored therein.

As shown in FIG. 21A, the user performs a long press on an "application recommendation" folder page (for example, for more than 1 second) with the finger, the control unit 12 generates a folder thumbnail 21 (as shown in FIG. 21B) of the "application recommendation" folder page in response to the long-press operation. In this procedure, the "application recommendation" folder page disappears from the touch display 11, or the procedure may be deemed as a procedure that the "application recommendation" folder page is quickly and gradually zoomed out to the folder thumbnail 21 as shown in FIG. 21B.

Next, as shown in FIG. 21B, the touch display 11 displays identification regions in a juxtaposing manner (not overlapping each other) as follows: a "recreation" folder identification region, a "social recreation" folder identification region, a "tool" folder identification region, an "application recommendation" folder identification region, a main interface identification region and a new folder identification region. The above-described respective identification regions are a plurality of identification regions displayed in a second display state. Correspondingly, a "recreation" folder, a "social recreation" folder, a "tool" folder, an "application recommendation folder, a default standby page and a new folder respectively corresponding to the above-described identification regions are the second object of this embodiment. As described above, the main interface identification region corresponds to a default standby page of the electronic apparatus 10, and displays thereon the application program icons as follows: telephone, information and browser. The new folder identification region is an identification region corresponding to the new folder command.

Next, the user's finger keeps pressing on the folder thumbnail 21, and gradually moves (drags) the finger to a position as shown in FIG. 21C, that is, the main interface identification region. In this procedure, the folder thumbnail 21 moves along with the user's finger, and ultimately reaches the position as shown in FIG. 21C.

Next, the user's finger is lifted off the touch display 11 in the position as shown in FIG. 21C, and the folder thumbnail 21 is placed in the main interface identification region. As shown in FIG. 21D, after the folder thumbnail 21 is placed in the main interface identification region, the control unit 12 controls to display the default standby page of the electronic apparatus 10 corresponding to the main interface identification region, and controls to generate the "application recommendation" folder page on the default standby page. On the "application recommendation" folder page, there may be displayed icons of respective application programs as included in the "application recommendation" folder. Correspondingly, a memory address of the "application recommendation" folder (including the respective application programs therein) in a storage unit is modified to a memory address of the default standby page.

In addition, although FIG. 21D illustrates the case where the user moves the folder thumbnail 21 to the main interface identification region through the finger drag operation, those skilled should understand that, the user may, based on the case as shown in FIG. 21B, further move the folder thumbnail 21 to several other identification regions.

In addition, although FIG. 21D shows the case where the "application recommendation" folder page is displayed on the default standby page, the present disclosure is not limited thereto. After the folder thumbnail 21 is placed in the main interface identification region, the control unit 12 may further control to display the "application recommendation" folder icon in the default standby page. That is, the "application recommendation" folder is not unfolded in the default standby page.

The respective embodiments as described above are only illustrative. In application, the operations in the above one or more embodiments may be combined as required; or part of the operations may further be deleted from a certain embodiment.

For example, in preceding steps of putting the folder in the unfolded state, for example, step 106 in Embodiment One, step 206 in Embodiment Two, step 306 in Embodiment Three, step 406 in Embodiment Four, step 506 in Embodiment Five, etc., steps S210, S220 and S230 in Embodiment Twelve described in conjunction with FIG. 9 may be included therein. Similarly, the processing unit 66 as described in Embodiment Six to Embodiment Ten may include the obtaining unit 910, the presentation determining unit 920 and the control unit 930 in Embodiment Fifteen described in conjunction with FIG. 16; and the processor 72 in Embodiment Eleven may implement the operations of the obtaining unit 910, the presentation determining unit 920 and the control unit 930.

As another example, the display control methods in Embodiment One to Embodiment Five may also include one or more of the steps of the display control method in Embodiment Twenty, and vice versa. The display control methods in Embodiment Twelve, Embodiment Thirteen and Embodiment Fourteen may include one or more of the steps of the display control method in Embodiment Twenty, and vice versa. Similarly, the display control devices as described in Embodiment Six to Embodiment Ten may include the touch display 11 and the control unit 12 in Embodiment Seventeen and Embodiment Eighteen, and the electronic apparatuses in Embodiment Seventeen and Embodiment Eighteen may also include the display control devices in Embodiment Six to Embodiment Ten. The display control devices in Embodiment Fifteen and Embodiment Sixteen may include one or more of the operations of the electronic apparatuses in Embodiment Seventeen, Embodiment Eighteen and Embodiment Nineteen, and vice versa. The display control devices in Embodiment Fifteen and Embodiment Sixteen may include one or more of the operations of the electronic apparatuses in Embodiment Seventeen, Embodiment Eighteen and Embodiment Nineteen, and vice versa.

It should be noted that, terms used herein is to describe specific embodiments only, and is not intended to be limitative. Unless otherwise clearly specified in the context, singular forms "a/an", and "the (said)" as used in the present text are intended to include plural forms as well. Terms "comprise", "include" or other variants mean to cover non-exclusive comprising, so a process, method, object or apparatus comprising a series of elements not only comprises these elements, but also comprises other unclearly listed elements, or further comprises inherent elements of such process, method, object or apparatus. In the case where there is no more limitation, an element defined by a phase "comprising . . . " does not exclude a fact that the process, the method, the article, or the apparatus including the above elements also has other identical elements.

In several embodiments provided, it should be understood that the methods and the smart apparatuses disclosed may be implemented in other modes. The above-described device embodiments are only exemplary, for example, the division of the units is only a logical functional division, and there may be other modes of division when they are actually implemented. For example, a plurality of units or components may be combined or may be integrated into another system, or some features may be omitted or not executed. In addition, coupling between the respective components shown or discussed, either direct coupling or communicative connection, may be implemented through some interfaces, and indirect coupling or communicative connection between the apparatuses or the units may be electrical, mechanical, or in other forms.

The above units described as separate components may be or may not be physically separated, and the components displayed as units may be or may not be physical units, i.e., may be located in one place, or may be distributed in a plurality of network elements; and the purpose of this embodiment may be achieved by selecting some or all of the units therein as actually required.

Moreover, the individual functional units in various embodiments of the present disclosure can be integrated into one second processing unit, or each unit may exist physically and separately, or two or more units may be integrated into one unit; the above-described integrated units may be implemented in a form of hardware, or may be implemented in a form of a hardware-plus-software functional unit.

The above are only specific embodiments of the present disclosure, but the scope of the present disclosure is not limited thereto, and any skilled in the art, within the technical scope disclosed by the present disclosure, can easily think of variations or replacements, which should be covered within the protection scope of the present disclosure.

The invention claimed is:

1. A display control method comprising:
starting a folder manager in response to a call instruction that is generated in response to an input operation for a first folder of five folders in an interactive interface currently displayed on a display screen of an electronic apparatus;
under control of the folder manager, obtaining the five folders on the electronic apparatus, wherein all icons of objects on the electronic apparatus are classified in a form of folder;
displaying folders displayed on the display screen in a queue manner, wherein the first folder in the queue is disposed to be in a foreground state and all remaining folders in the queue are disposed to be in a background state, wherein the displaying folders displayed on the display screen in a queue manner comprises:
determining a presentation manner in which the display contents of the first folder are displayed, wherein the determining the presentation manner of the display contents of the first folder comprises:
obtaining a plurality of icon identifiers in the first folder;
determining whether the plurality of icon identifiers can be completely displayed within the display region occupied by the first folder according to a standard display parameter;

displaying the plurality of icon identifiers according to the standard display parameter, when the plurality of icon identifiers can be displayed completely within the display region occupied by the first folder according to the standard display parameter; and displaying the plurality of icon identifiers according to a reduced display parameter, when the plurality of icon identifiers cannot be displayed completely within the display region occupied by the first folder according to the standard display parameter, a display size of each icon identifier under the reduced display parameter being smaller than a display size of the icon identifier under the standard display parameter;

wherein the display control method further comprises:
obtaining an operation for a title of one of the folders in the background state; and
switching the folder corresponding to the title to a first position of the queue;

wherein the display screen is a touch display, and the display control method further comprises the following processes that are executed after the displaying the folders displayed on the display screen in a queue manner:

in a case that the touch display receives a first operation for the first folder, generating a first folder thumbnail corresponding to the first folder in response to the first operation, and switching the touch display from a first display state to a second display state in response to the first operation, wherein, in the first display state the five folders displayed on the display screen are displayed in a queue pattern and the first folder is in a first position of the queue, and in the second display state, the five folders displayed on the display screen are displayed in a thumbnail pattern and occupy a plurality of folder thumbnail regions;

in a case that the touch display receives a moving operation for the first folder thumbnail after the touch display unit is switched to the second display state, determining a position of the first folder thumbnail according to an end position of the moving operation; and in a case that a position where the end position of the moving operation corresponds to a specific folder thumbnail region in the plurality of folder thumbnail regions, determining a position of the first folder thumbnail according to the specific folder thumbnail region.

2. The display control method according to claim 1, wherein the folder icon has a corresponding folder within the interactive interface.

3. The display control method according to claim 2, wherein the queue is arranged in a Z-axis direction of the display screen.

4. The display control method according to claim 3, wherein, all contents of the first folder in the foreground state are shown on the display screen; and for each folder in the background state located posterior to the first folder in the foreground state, a title is not blocked by a folder located in front of thereof.

5. The display control method according to claim 1, further comprising:
obtaining a slide operation along a Y-axis on the display screen, and switching the first folder in a first position in the queue to a last position in the queue; and
switching a folder previously adjacent and covered by the first folder to the first position in the queue to be displayed, wherein the Y axis is in a direction along which the folders are arranged in the queue and the slide operation is sliding along a direction of the Y axis.

6. A display control device, comprising:
a processor,
a memory for storing computer program instructions,
wherein, the computer program instructions, when being executed by the processor, performs the following processes:
starting a folder manager in response to a call instruction that is generated in response to an input operation for a first folder of five folders in an interactive interface currently displayed on a display screen of an electronic apparatus;
under control of the folder manager, obtaining the five folders on the electronic apparatus, wherein icons of objects on the electronic apparatus are classified in a form of folder; and
displaying folders displayed on the display screen in a queue manner, wherein the first folder in the queue is disposed to be in a foreground state and all remaining folders in the queue are disposed to be in a background state, wherein the displaying folders displayed on the display screen in a queue manner comprises:
determining a presentation manner in which the display contents of the first folder are displayed, wherein the determining the presentation manner of the display content of the first folder comprises:
obtaining a plurality of icon identifiers in the first folder;
determining whether the plurality of icon identifiers can be completely displayed within the display region occupied by the first folder according to a standard display parameter;
displaying the plurality of icon identifiers according to the standard display parameter, when the plurality of icon identifiers can be displayed completely within the display region occupied by the first folder according to the standard display parameter; and
displaying the plurality of icon identifiers according to a reduced display parameter, when the plurality of icon identifiers cannot be displayed completely within the display region occupied by the first folder according to the standard display parameter, a display size of each icon identifier under the reduced display parameter being smaller than a display size of the icon identifier under the standard display parameter;

wherein the computer program instructions, when being executed by the processor, further perform the process of:
obtaining an operation on a title of one of the folders in the background state; and
in response to the operation, switching the folder corresponding to the title to a first position of the queue, wherein the display screen is a touch display, wherein the following processes that are executed after the displaying the folders displayed on the display screen in a queue manner:

in a case that the touch display receives a first operation for the first folder, generating a first folder thumbnail corresponding to the first folder in response to the first operation, and switching the touch display from a first display state to a second display state in response to the first operation, wherein, in the first display state the five folders displayed on the display are displayed in a queue pattern and the first folder is in a first position of the queue and in the second display state, the five folders displayed on the display screen are displayed in a thumbnail pattern and occupy a plurality of folder thumbnail regions;

in a case that the touch display receives a moving operation for the first folder thumbnail-after the touch display unit is switched to the second display state, determining a position of the first folder thumbnail according to an end position of the moving operation; and in a case that a position where the end position of the moving operation corresponds to a specific folder thumbnail region in the plurality of folder thumbnail regions, determining a position of the first folder thumbnail according to the specific folder thumbnail region.

7. The display control device according to claim 6, wherein the folder icon has a corresponding folder within the interactive interface.

8. The display control device according to claim 7, wherein the computer program instructions, when being executed by the processor, further performs the process of, when the folders in the background state are displayed on the display screen in the queue, arranging the queue in a Z-axis direction on the display screen.

9. The display control device according to claim 8, wherein all contents of the first folder in the foreground state are shown on the display screen; and for each folder in the-background state located posterior to the first folder in the foreground state, a title is not blocked by a folder that is located in front of thereof.

10. The display control device according to claim 6, wherein the computer program instructions, when being executed by the processor, further performs the process of:

obtaining a slide operation along a Y-axis on the display screen, and switching the first folder in the first position in the queue to a last position of the queue, and switching a folder previously adjacent and covered by the first folder to the first position in the queue to be displayed, wherein the Y axis is in a direction along which the folders are arranged in the queue and the slide operation is sliding along a direction of the Y axis.

11. An electronic apparatus, comprising:

a display screen;

a processor;

a memory for storing computer program instructions, wherein, the computer program instructions, when executed by the processor, perform the following processes:

starting a folder manager in response to a call instruction that is generated in response to an input operation for a first folder of five folders in an interactive interface currently displayed on a display screen of an electronic apparatus;

under control of the folder manager, obtaining the five folders on the electronic apparatus, wherein icons of objects on the electronic apparatus are classified in a form of folder;

displaying folders displayed on the display screen in a queue manner, wherein the first folder in the queue is disposed to be in a foreground state and the remaining folders in the queue are disposed in a background state, where the displaying folders displayed on the display screen in a queue manner comprises:

determining a presentation manner in which the display contents of the first folder are displayed, wherein the determining the presentation manner of the display contents of the first folder comprises:

obtaining a plurality of icon identifiers in the first folder;

determining whether the plurality of icon identifiers can be completely displayed within the display region occupied by the first folder according to a standard display parameter; and displaying the plurality of icon identifiers according to a reduced display parameter, when the plurality of icon identifiers cannot be displayed completely within the display region occupied by the first folder according to the standard display parameter, a display size of each icon identifier under the reduced display parameter being smaller than a display size of the icon identifier under the standard display parameter;

wherein the computer program instructions, when being executed by the processor, further perform the process of:

obtaining an operation on a title of one of the folders in the background state; and in response to the operation, switching the folder corresponding to the title to a first position of the queue, wherein the display screen is a touch display, and wherein the following processes that are executed after the displaying the folders displayed on the display screen in a queue manner:

in a case that the touch display receives a first operation for the first folder, generating a first folder thumbnail corresponding to the first folder in response to the first operation, and switching the touch display from a first display state to a second display state in response to the first operation, wherein, in the first display state the five folders displayed on the display screen are displayed in a queue pattern and the first folder is in a first position of the queue, and in the second display state, the five folders displayed on the display screen are displayed in a thumbnail pattern and occupy a plurality of folder thumbnail regions;

in a case that the touch display receives a moving operation for the first folder thumbnail after the touch display unit is switched to the second display state, determining a position of the first folder thumbnail according to an end position of the moving operation; and in a case that a position where the end position of the moving operation corresponds to a specific folder thumbnail region in the plurality of folder thumbnail regions, determining a position of the first folder thumbnail according to the specific folder thumbnail region.

* * * * *